United States Patent
Gasda et al.

(10) Patent No.: US 11,870,121 B2
(45) Date of Patent: Jan. 9, 2024

(54) FUEL CELL COLUMN INCLUDING STRESS MITIGATION STRUCTURES

(71) Applicant: BLOOM ENERGY CORPORATION, San Jose, CA (US)

(72) Inventors: Michael Gasda, Sunnyvale, CA (US); Robert Hintz, San Jose, CA (US); Karanpal Bhangu, Manteca, CA (US); Siddharth Patel, Menlo Park, CA (US); Harald Herchen, Los Altos, CA (US); Victor Silva, Denver, CO (US); Thuy Thanh Muhl, San Jose, CA (US); Tyler Dawson, Sunnyvale, CA (US); David Edmonston, Soquel, CA (US); Tad Armstrong, Burlingame, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/054,377

(22) Filed: Nov. 10, 2022

(65) Prior Publication Data

US 2023/0155157 A1   May 18, 2023

Related U.S. Application Data

(60) Provisional application No. 63/365,163, filed on May 23, 2022, provisional application No. 63/278,486, filed on Nov. 12, 2021.

(51) Int. Cl.
*H01M 8/00* (2016.01)
*H01M 8/2483* (2016.01)
(Continued)

(52) U.S. Cl.
CPC ......... *H01M 8/2483* (2016.02); *H01M 8/021* (2013.01); *H01M 8/0258* (2013.01); *H01M 8/0282* (2013.01); *Y02E 60/50* (2013.01)

(58) Field of Classification Search
CPC .. H01M 8/2483; H01M 8/021; H01M 8/0258; H01M 8/0282; Y02E 60/50
See application file for complete search history.

(56) References Cited

U.S. PATENT DOCUMENTS 9,368,810 B2  6/2016  Darga et al.
9,673,457 B2  6/2017  Srivatsan et al.
(Continued)

FOREIGN PATENT DOCUMENTS

FR   3056337 A1 * 3/2018 ............... C25B 1/00
JP   10-228918 A   8/1998
(Continued)

OTHER PUBLICATIONS

Edmonston, D. et al., "Fuel Plenum and Fuel Cell Stack Including Same," U.S. Appl. No. 17/804,913, filed Jun. 1, 2022.
(Continued)

*Primary Examiner* — Cynthia H Kelly
*Assistant Examiner* — Monique M Wills
(74) *Attorney, Agent, or Firm* — THE MARBURY LAW GROUP PLLC

(57) ABSTRACT

A fuel cell column includes a stack of alternating fuel cells and interconnects, where the interconnects separate adjacent fuel cells in the stack and contain fuel and air channels which are configured to provide respective fuel and air to the fuel cells. a manifold plate containing a bottom inlet hole and a bottom outlet hole located in a bottom surface of the manifold plate, top outlet holes and top inlet holes formed in opposing sides of a top surface of the manifold plate, outlet channels fluidly connecting the top outlet holes to the bottom inlet hole, and inlet channels fluidly connecting the top inlet holes to the bottom outlet hole, and a mitigation structure configured to reduce stress applied to the stack due to at least one of a shape mismatch or coefficient of thermal (Continued)

expansion mismatch between the stack and the manifold plate.

20 Claims, 17 Drawing Sheets

(51) Int. Cl.
*H01M 8/021* (2016.01)
*H01M 8/0258* (2016.01)
*H01M 8/0282* (2016.01)

(56) References Cited

U.S. PATENT DOCUMENTS

| | | |
|---|---|---|
| 10,211,478 B2 | 2/2019 | Armstrong et al. |
| 10,431,833 B2 | 10/2019 | Wilson et al. |
| 11,374,232 B2 | 6/2022 | Patel et al. |
| 2005/0019644 A1 | 1/2005 | Farooque et al. |
| 2007/0042250 A1 | 2/2007 | Inagaki |
| 2008/0187805 A1* | 8/2008 | Jinba .............. H01M 8/04052 429/444 |
| 2009/0004532 A1* | 1/2009 | Haltiner, Jr. ........ H01M 8/2465 429/457 |
| 2013/0230792 A1 | 9/2013 | Wilson et al. |
| 2017/0104233 A1* | 4/2017 | Armstrong ............ H01M 8/247 |
| 2019/0036144 A1* | 1/2019 | Yajima ................ H01M 8/0232 |
| 2019/0372132 A1 | 12/2019 | Gasda et al. |
| 2021/0143448 A1* | 5/2021 | Blackburn ............ H01M 8/222 |
| 2021/0351420 A1 | 11/2021 | Patel et al. |

FOREIGN PATENT DOCUMENTS

| | | | |
|---|---|---|---|
| JP | 2006012453 A * | 1/2006 | ............ Y02E 60/50 |
| JP | 2007-317428 A | 12/2007 | |
| KR | 10-2021-0075776 A | 6/2021 | |
| WO | WO-2007044045 A2 * | 4/2007 | ............ H01M 8/021 |

OTHER PUBLICATIONS

Gasda, M. D. et al., "Method of Making a Fuel Cell Stack with Stress Reducing Seals," U.S. Appl. No. 17/206,790, filed Mar. 19, 2021.

China National Intellectual Property Administration ("CNIPA") Office Communication for PRC (China) Patent Application No. 202222994473.0, dated Feb. 24, 2023, 2 pages.

European Patent Office Communication, Extended Search Report and Written Opinion by Examiner from the EPO for European Patent Application No. 22206529, dated May 19, 2023, 46 pages.

* cited by examiner

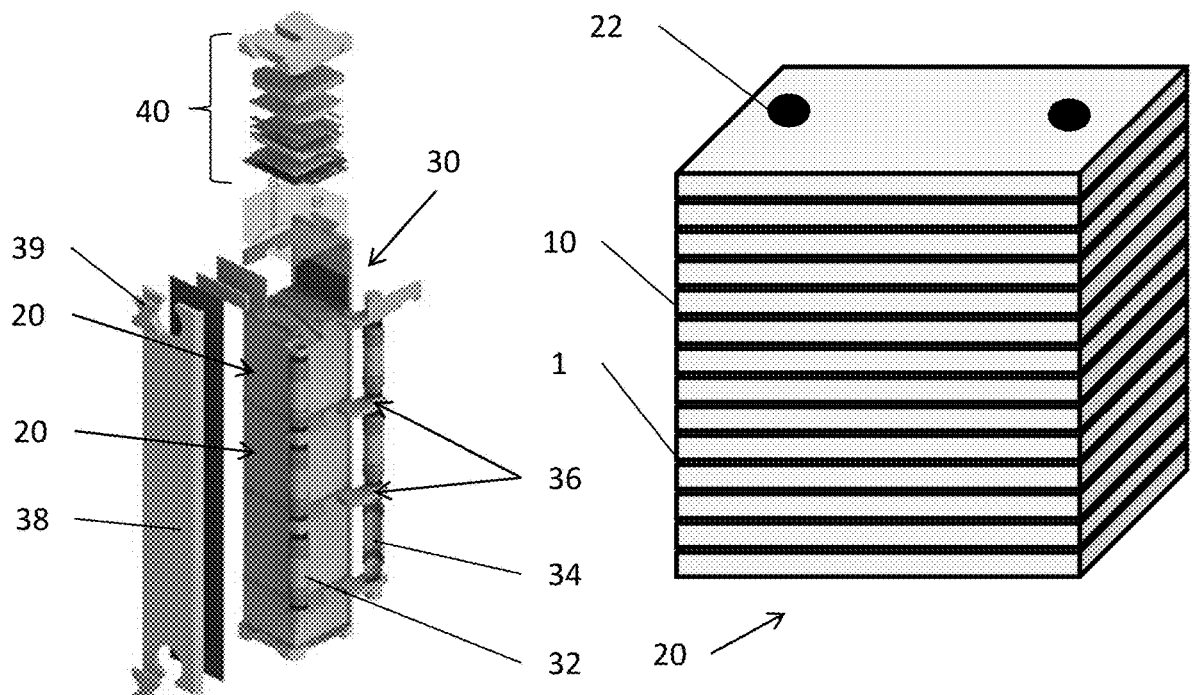
FIG. 1A
(Related Art)
FIG. 1B
(Related Art)
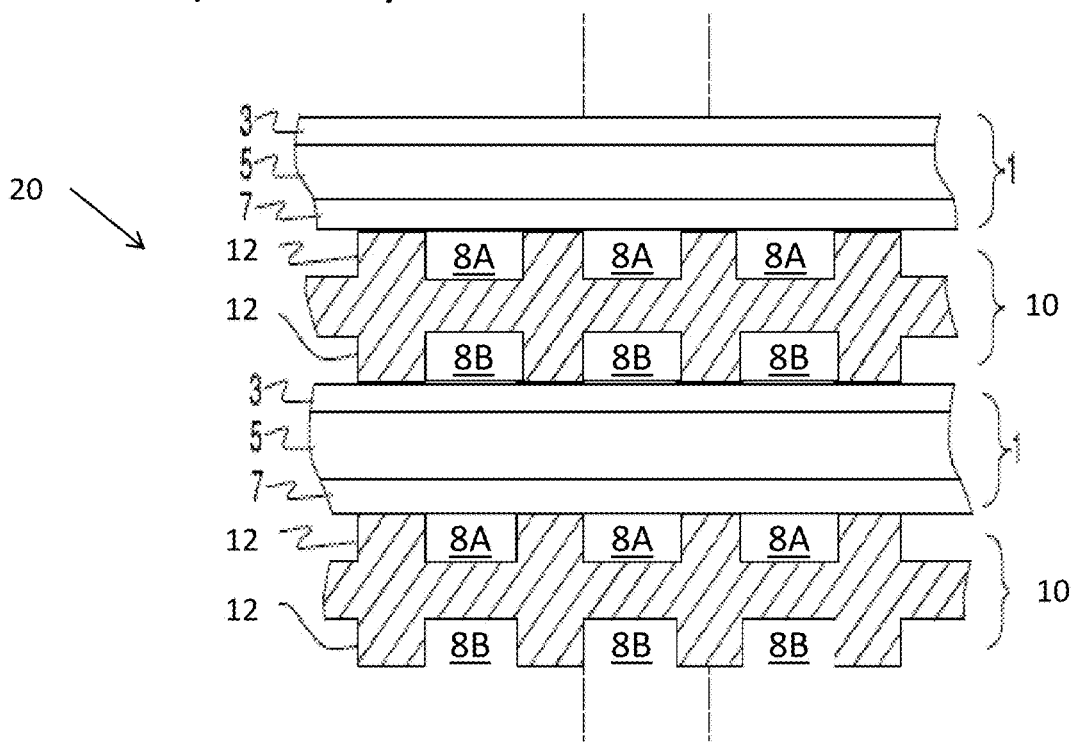
FIG. 1C
(Related Art)

FUEL CELL COLUMN INCLUDING STRESS MITIGATION STRUCTURES

FIELD

The present disclosure is directed to fuel cell columns in general, and to fuel cell columns including stress mitigation structures.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air are distributed to each cell using risers contained within the stack. In other words, the gas flows through openings or holes in the supporting layer of each fuel cell, such as the electrolyte layer, and gas flow separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

Fuel cell stacks are frequently built from a multiplicity of cells in the form of planar elements, tubes, or other geometries. Fuel and air have to be provided to the electrochemically active surface, which can be large. One component of a fuel cell stack is the gas flow separator (referred to as a gas flow separator plate in a planar stack) that separates the individual cells in the stack. The gas flow separator plate separates fuel, such as hydrogen or a hydrocarbon fuel, flowing to the fuel electrode (i.e., anode) of one cell in the stack from oxidant, such as air, flowing to the air electrode (i.e., cathode) of an adjacent cell in the stack. Frequently, the gas flow separator plate is also used as an interconnect which electrically connects the fuel electrode of one cell to the air electrode of the adjacent cell. In this case, the gas flow separator plate functions as an interconnect and is made of or contains an electrically conductive material.

SUMMARY

According to various embodiments of the present disclosure, a fuel cell column includes a stack of alternating fuel cells and interconnects, where the interconnects separate adjacent fuel cells in the stack and contain fuel and air channels which are configured to provide respective fuel and air to the fuel cells. a manifold plate containing a bottom inlet hole and a bottom outlet hole located in a bottom surface of the manifold plate, top outlet holes and top inlet holes formed in opposing sides of a top surface of the manifold plate, outlet channels fluidly connecting the top outlet holes to the bottom inlet hole, and inlet channels fluidly connecting the top inlet holes to the bottom outlet hole, and a mitigation structure configured to reduce stress applied to the stack due to at least one of a shape mismatch or coefficient of thermal expansion mismatch between the stack and the manifold plate.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 1A is a perspective view of a conventional fuel cell column, FIG. 1B is a perspective view of one counter-flow solid oxide fuel cell (SOFC) stack included in the column of FIG. 1A, and FIG. 1C is a side cross-sectional view of a portion of the stack of FIG. 1B.

DETAILED DESCRIPTION

Figure 2A:
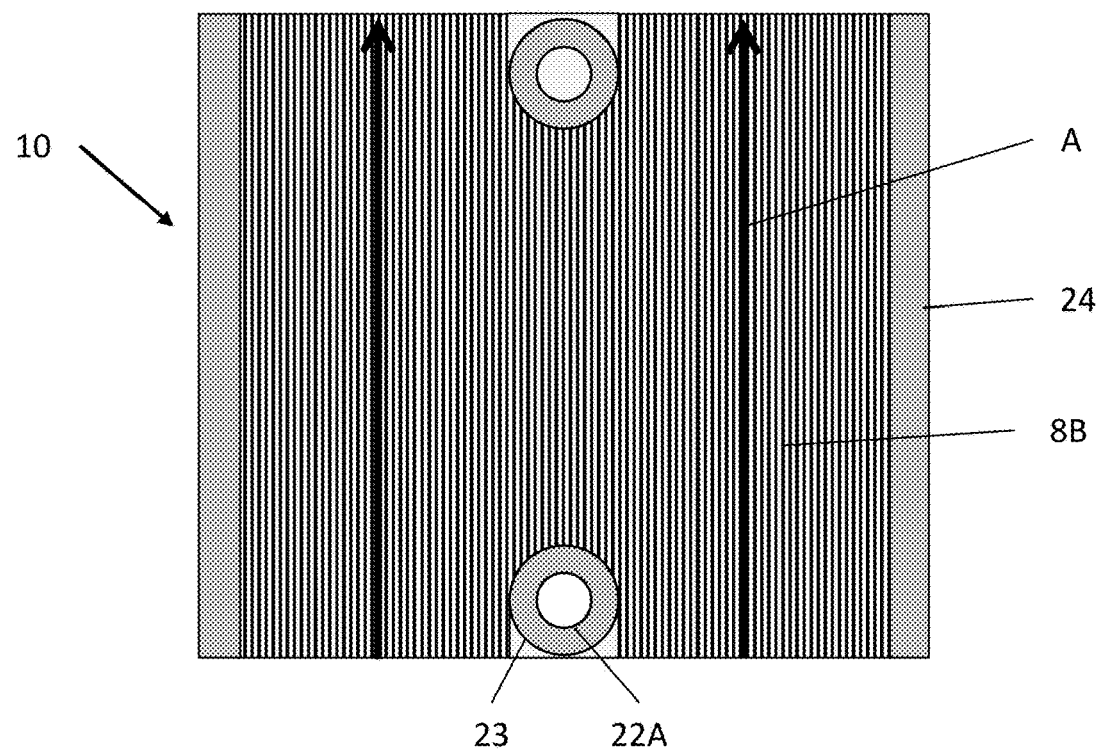
FIG. 2A is a top view of the air side of a conventional interconnect of the stack of FIG. 1B.

The various embodiments will be described in detail with reference to the accompanying drawings. The drawings are not necessarily to scale, and are intended to illustrate various features of the invention. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

FIG. 1A is a perspective view of a conventional fuel cell column 30, FIG. 1B is a perspective view of one counter-flow solid oxide fuel cell (SOFC) stack 20 included in the column 30 of FIG. 1A, and FIG. 1C is a side cross-sectional view of a portion of the stack 20 of FIG. 1B.

Referring to FIGS. 1A and 1B, the column 30 may include one or more stacks 20, a fuel inlet conduit 32, an anode exhaust conduit 34, and anode feed/return assemblies 36 (e.g., anode splitter plates (ASP's) 36). The column 30 may also include side baffles 38 and a compression assembly 40. The side baffles 38 may be connected to the compression assembly 40 and an underlying stack component (not shown) by ceramic connectors 39. The fuel inlet conduit 32 is fluidly connected to the ASP's 36 and is configured to provide the fuel feed to each ASP 36, and anode exhaust conduit 34 is fluidly connected to the ASP's 36 and is configured to receive anode fuel exhaust from each ASP 36.

The ASP's 36 are disposed between the stacks 20 and are configured to provide a hydrocarbon fuel containing fuel feed to the stacks 20 and to receive anode fuel exhaust from the stacks 20. For example, the ASP's 36 may be fluidly connected to internal fuel riser channels 22 formed in the stacks 20, as discussed below.

Referring to FIG. 1C, the stack 20 includes multiple fuel cells 1 that are separated by interconnects 10, which may also be referred to as gas flow separator plates or bipolar plates. Each fuel cell 1 includes a cathode electrode 3, a solid oxide electrolyte 5, and an anode electrode 7.

Each interconnect 10 electrically connects adjacent fuel cells 1 in the stack 20. In particular, an interconnect 10 may electrically connect the anode electrode 7 of one fuel cell 1 to the cathode electrode 3 of an adjacent fuel cell 1. FIG. 1C shows that the lower fuel cell 1 is located between two interconnects 10.

Each interconnect 10 includes ribs 12 that at least partially define fuel channels 8A and air channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 20, there may be an air end plate or fuel end plate (not shown) for providing air or fuel, respectively, to the end electrode.

Figure 2B:
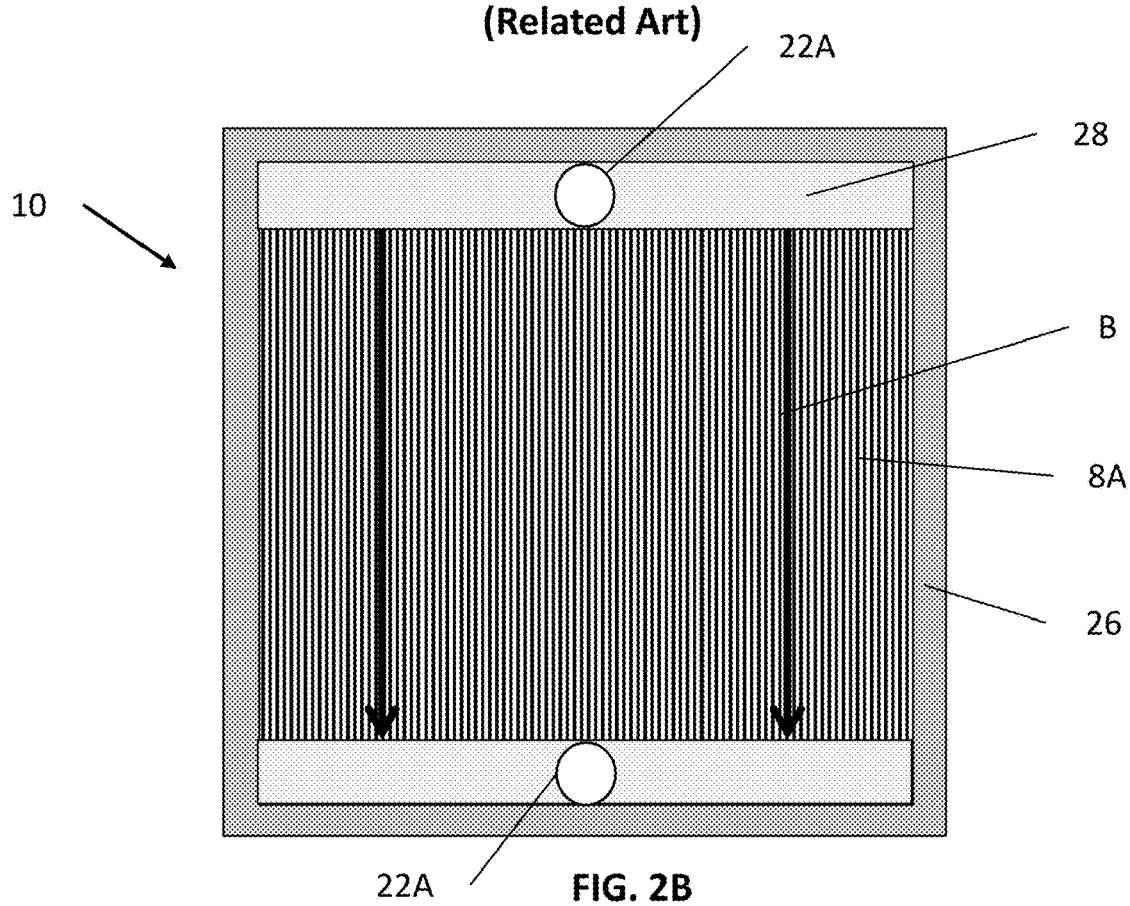
FIG. 2B is a top view of the fuel side of the conventional interconnect.

FIG. 2A is a top view of the air side of the conventional interconnect 10, and FIG. 2B is a top view of a fuel side of the interconnect 10. Referring to FIGS. 1C and 2A, the air side includes the air channels 8B. Air flows through the air channels 8B to a cathode electrode 3 of an adjacent fuel cell 1. In particular, the air may flow across the interconnect 10 in a first direction A as indicated by the arrows.

Ring seals 23 may surround fuel holes 22A of the interconnect 10, to prevent fuel from contacting the cathode electrode. Peripheral strip-shaped seals 24 are located on peripheral portions of the air side of the interconnect 10. The seals 23, 24 may be formed of a glass material. The peripheral portions may be in the form of an elevated plateau which does not include ribs or channels. The surface of the peripheral regions may be coplanar with tops of the ribs 12.

Referring to FIGS. 1C and 2B, the fuel side of the interconnect 10 may include the fuel channels 8A and fuel manifolds 28 (e.g., fuel plenums). Fuel flows from one of the fuel holes 22A, into the adjacent manifold 28, through the fuel channels 8A, and to an anode 7 of an adjacent fuel cell 1. Excess fuel may flow into the other fuel manifold 28 and then into the adjacent fuel hole 22A. In particular, the fuel may flow across the interconnect 10 in a second direction B, as indicated by the arrows. The second direction B may be perpendicular to the first direction A (see FIG. 2A).

A frame-shaped seal 26 is disposed on a peripheral region of the fuel side of the interconnect 10. The peripheral region may be an elevated plateau which does not include ribs or channels. The surface of the peripheral region may be coplanar with tops of the ribs 12.

Accordingly, a conventional counter-flow fuel cell column, as shown in FIGS. 1A, 1B, 1C, 2A, and 2B, may include complex fuel distribution systems (fuel rails and anode splitter plates). In addition, the use of an internal fuel riser may require holes in fuel cells and corresponding seals, which may reduce an active area thereof and may cause cracks in the ceramic electrolytes of the fuel cells 1.

The fuel manifolds 28 may occupy a relatively large region of the interconnect 10, which may reduce the contact area between the interconnect 10 and an adjacent fuel cell by approximately 10%. The fuel manifolds 28 are also relatively deep, such that the fuel manifolds 28 represent relatively thin regions of the interconnect 10. Since the interconnect 10 is generally formed by a powder metallurgy compaction process, the density of fuel manifold regions may approach the theoretical density limit of the interconnect material. As such, the length of stroke of a compaction press used in the compaction process may be limited due to the high-density fuel manifold regions being incapable of being compacted further. As a result, the density achieved elsewhere in the interconnect 10 may be limited to a lower level by the limitation to the compaction stroke. The resultant density variation may lead to topographical variations, which may reduce the amount of contact between the interconnect 10 a fuel cell 1 and may result in lower stack yield and/or performance.

Another important consideration in fuel cell system design is in the area of operational efficiency. Maximizing fuel utilization is a key factor to achieving operational efficiency. Fuel utilization is the ratio of how much fuel is consumed during operation, relative to how much is delivered to a fuel cell. An important factor in preserving fuel cell cycle life may be avoiding fuel starvation in fuel cell active areas, by appropriately distributing fuel to the active areas. If there is a maldistribution of fuel such that some flow field channels receive insufficient fuel to support the electrochemical reaction that would occur in the region of that channel, it may result in fuel starvation in fuel cell areas adjacent that channel. In order to distribute fuel more uniformly, conventional interconnect designs include channel depth variations across the flow field. This may create complications not only in the manufacturing process, but may also require complex metrology to measure these dimensions accurately. The varying channel geometry may be constrained by the way fuel is distributed through fuel holes and distribution manifolds.

One possible solution to eliminate this complicated geometry and the fuel manifold is to have a wider fuel opening to ensure much more uniform fuel distribution across the fuel flow field. Since fuel manifold formation is a factor in density variation, elimination of fuel manifolds should enable more uniform interconnect density and permeability. Accordingly, there is a need for improved interconnects that provide for uniform contact with fuel cells, while also uniformly distributing fuel to the fuel cells without the use of conventional fuel manifolds.

Owing to the overall restrictions in expanding the size of a hotbox of a fuel cell system, there is also a need for improved interconnects designed to maximize fuel utilization and fuel cell active area, without increasing the footprint of a hotbox.

Cross-Flow Fuel Cell Systems

Figure 3A:
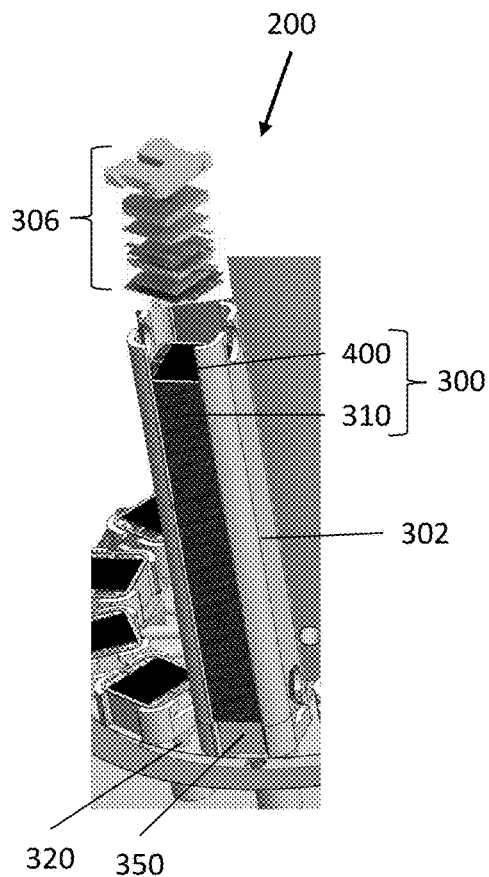
FIG. 3A is a perspective view of a fuel cell stack, according to various embodiments of the present disclosure.
Figure 3D:
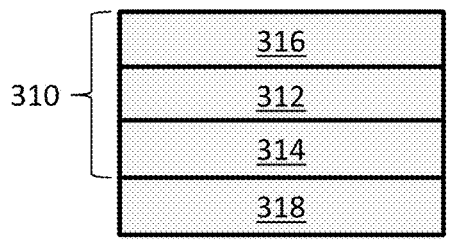
FIG. 3D is a schematic view of a fuel cell included in the stack of FIG. 3A.
Figure 3C:
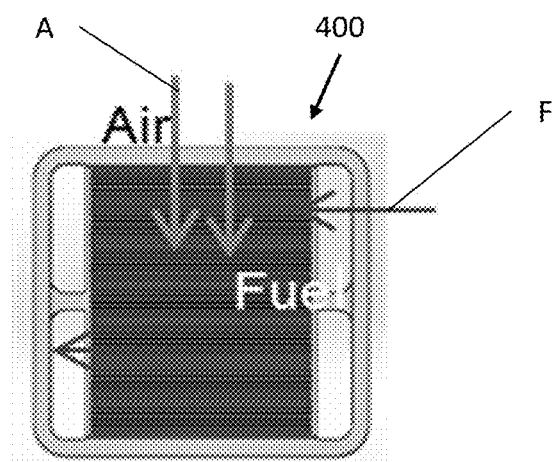
FIG. 3C is a top view of the fuel side of an interconnect included in the stack of FIG. 3A.
Figure 3B:
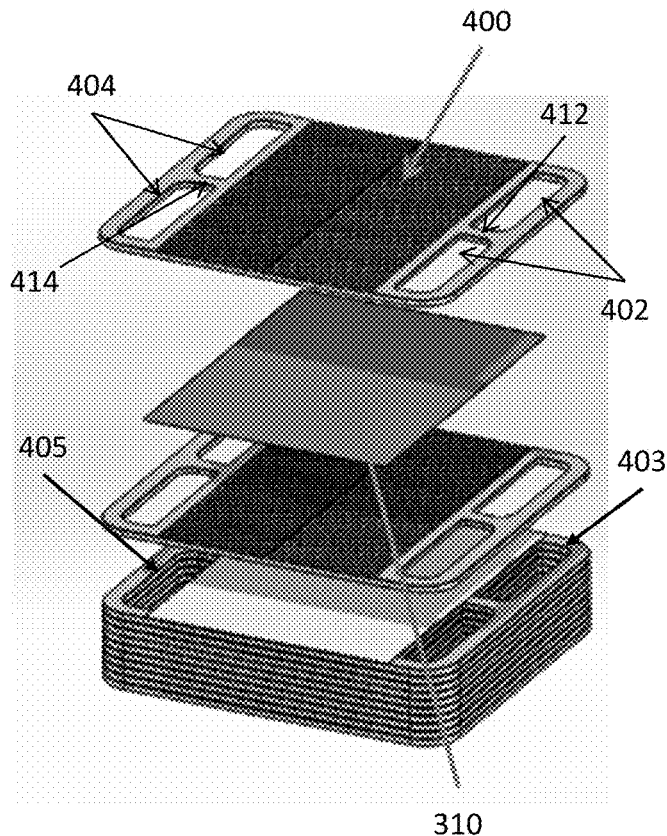
FIG. 3B is an exploded perspective view of a portion of the stack of FIG. 3A.

FIG. 3A is a perspective view of a fuel cell column 200, according to various embodiments of the present disclosure, FIG. 3B is an exploded perspective view of a portion of the column 200 of FIG. 3A, FIG. 3C is a top view of the fuel side of an interconnect 400 included in the column 200, and FIG. 3D is a schematic view of a fuel cell included in the column 200.

Referring to FIGS. 3A-3D, the fuel cell column 200 includes at least one fuel cell stack 300 that includes multiple fuel cells 310 that are separated by interconnects 400, which may also be referred to as gas flow separator plates or bipolar plates. One or more columns 200 may be thermally integrated with other components of a fuel cell power generating system (e.g., one or more anode tail gas oxidizers, fuel reformers, fluid conduits and manifolds, etc.) in a common enclosure or "hotbox."

The interconnects 400 are made from an electrically conductive metal material. For example, the interconnects 400 may comprise a chromium alloy, such as a Cr—Fe alloy. The interconnects 400 may typically be fabricated using a powder metallurgy technique that includes pressing and sintering a Cr—Fe powder, which may be a mixture of Cr and Fe powders or an Cr—Fe alloy powder, to form a Cr—Fe interconnect in a desired size and shape (e.g., a "net shape" or "near net shape" process). A typical chromium-alloy interconnect 400 comprises more than about 90% chromium by weight, such as about 94-96% (e.g., 95%) chromium by weight. An interconnect 400 may also contain less than about 10% iron by weight, such as about 4-6% (e.g., 5%) iron by weight, may contain less than about 2% by weight, such as about zero to 1% by weight, of other materials, such as yttrium or yttria, as well as residual or unavoidable impurities.

Each fuel cell 310 may include a solid oxide electrolyte 312, an anode 314, and a cathode 316. In some embodiments, the anode 314 and the cathode 316 may be printed on the electrolyte 312. In other embodiments, a conductive layer 318, such as a nickel mesh, may be disposed between the anode 314 and an adjacent interconnect 400. The fuel cell 310 does not include through-holes, such as the fuel holes of conventional fuel cells. Therefore, the fuel cell 310 avoids cracks that may be generated due to the presence of such through-holes.

An upper most interconnect 400 and a lowermost interconnect 400 of the column 200 may be different ones of an air end plate or fuel end plate including features for providing air or fuel, respectively, to an adjacent end fuel cell 310. As used herein, an "interconnect" may refer to either an interconnect located between two fuel cells 310 or an end plate located at an end of the stack and directly adjacent to only one fuel cell 310. Since the column 200 does not include ASPs and the end plates associated therewith, the column 200 may include only two end plates. As a result, stack dimensional variations associated with the use of intra-column ASPs may be avoided.

The column 200 may include side baffles 302, a fuel plenum 350, and a compression assembly 306. The side baffles 302 may be formed of a ceramic material and may be disposed on opposing sides of the fuel cell column 200 containing stacked fuel cells 310 and interconnects 400. The side baffles 302 may connect the fuel plenum 350 and the compression assembly 306, such that the compression assembly 306 may apply pressure to the column 200. The side baffles 302 may be curved baffle plates, such each baffle plate covers at least portions of three sides of the fuel cell column 200. For example, one baffle plate may fully cover the fuel inlet riser side of the column 200 and partially covers the adjacent front and back sides of the stack, while the other baffle plate fully covers the fuel outlet riser side of the stack and partially covers the adjacent portions of the front and back sides of the stack. The remaining uncovered portions for the front and back sides of the stack allow the air to flow through the column 200. The curved baffle plates provide an improved air flow control through the stack compared to the conventional baffle plates 38 which cover only one side of the stack. The fuel plenum 350 may be disposed below the column 200 and may be configured to provide a hydrogen-containing fuel feed to the column 200, and may receive an anode fuel exhaust from the column 200. The fuel plenum 350 may be connected to fuel inlet and outlet conduits 320 which are located below the fuel plenum 350.

Each interconnect 400 electrically connects adjacent fuel cells 310 in the column 200. In particular, an interconnect 400 may electrically connect the anode electrode of one fuel cell 310 to the cathode electrode of an adjacent fuel cell 310. As shown in FIG. 3C, each interconnect 400 may be configured to channel air in a first direction A, such that the air may be provided to the cathode of an adjacent fuel cell 310. Each interconnect 400 may also be configured to channel fuel in a second direction F, such that the fuel may be provided to the anode of an adjacent fuel cell 310. Directions A and F may be perpendicular, or substantially perpendicular. As such, the interconnects 400 may be referred to as cross-flow interconnects.

The interconnect 400 may include fuel holes that extend through the interconnect 400 and that are configured for fuel distribution. For example, the fuel holes may include one or more fuel inlets 402 and one or more fuel (e.g., anode exhaust) outlets 404, which may also be referred to as anode exhaust outlets 404. The fuel inlets and outlets 402, 404 may be disposed outside of the perimeter of the fuel cells 310. As such, the fuel cells 310 may be formed without corresponding through-holes for fuel flow. The combined length of the fuel inlets 402 and/or the combined length of the fuel outlets 404 may be at least 75% of a corresponding length of the interconnect 400 e.g., a length taken in direction A.

In one embodiment, each interconnect 400 contains two fuel inlets 402 separated by a neck portion 412 of the interconnect 400, as shown in FIG. 3B. However, more than two fuel inlets 402 may be included, such as three to five inlets separated by two to four neck portions 412. In one embodiment, each interconnect 400 contains two fuel outlets 404 separated by a neck portion 414 of the interconnect 400, as shown in FIG. 3B. However, more than two fuel outlets 404 may be included, such as three to five outlets separated by two to four neck portions 414.

The fuel inlets 402 of adjacent interconnects 400 may be aligned in the column 200 to form one or more fuel inlet risers 403. The fuel outlets 404 of adjacent interconnects 400 may be aligned in the column 200 to form one or more fuel outlet risers 405. The fuel inlet riser 403 may be configured to distribute fuel received from the fuel plenum 350 to the fuel cells 310. The fuel outlet riser 405 may be configured to provide anode exhaust received from the fuel cells 310 to the fuel plenum 350.

Unlike the flat related art side baffles 38 of FIG. 1A, the side baffles 302 may be curved around edges of the interconnects 400. In particular, the side baffles 302 may be disposed around the fuel inlets 402 and outlets 404 of the interconnects 400. Accordingly, the side baffles may more efficiently control air flow through air channels of the interconnects 400, which are exposed between the side baffles 302 and are described in detail with regard to FIGS. 4A and 4B.

In various embodiments, the column 200 may include at least 30, at least 40, at least 50, or at least 60 fuel cells, which may be provided with fuel using only the fuel risers 403, 405. In other words, as compared to a conventional fuel cell system, the cross-flow configuration allows for a large number of fuel cells to be provided with fuel, without the need for ASP's or external stack fuel manifolds, such as external conduits 32, 34 shown in FIG. 1A.

Each interconnect 400 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 400 may comprise a metal (e.g., a chromium-iron alloy, such as 4-6 weight percent iron, optionally 1 or less weight percent yttrium and balance chromium alloy), and may electrically connect the anode or fuel-side of one fuel cell 310 to the cathode or air-side of an adjacent fuel cell 310. An electrically conductive contact layer, such as a nickel contact layer (e.g., a nickel mesh), may be provided between anode and each interconnect 400. Another optional electrically conductive contact layer may be provided between the cathode electrodes and each interconnect 400.

A surface of an interconnect 400 that in operation is exposed to an oxidizing environment (e.g., air), such as the cathode-facing side of the interconnect 400, may be coated with a protective coating in order to decrease the growth rate of a chromium oxide surface layer on the interconnect and to suppress evaporation of chromium vapor species which can poison the fuel cell cathode. Typically, the coating, which can comprise a perovskite such as lanthanum strontium manganite (LSM), may be formed using a spray coating or dip coating process. Alternatively, other metal oxide coatings, such as a spinel, such as an $(Mn, Co)_3O_4$ spinel (MCO), can be used instead of or in addition to LSM. Any spinel having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used. In other embodiments, a mixed layer of LSM and MCO, or a stack of LSM and MCO layers may be used as the coating.

Figure 4A:
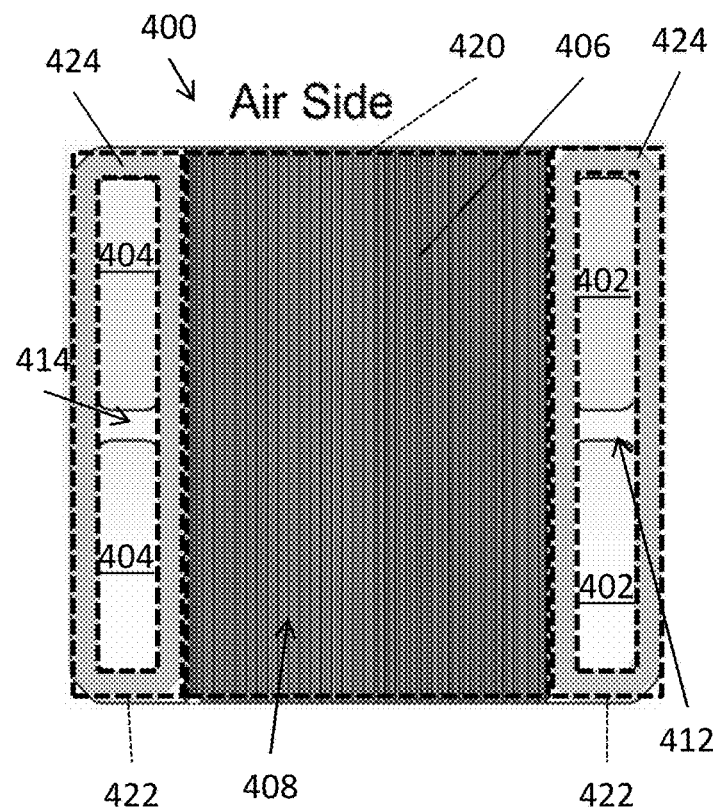
FIGS. 4A and 4B are plan views showing, respectively, an air side and a fuel side of the cross-flow interconnect of FIG. 3C, according to various embodiments of the present disclosure.
Figure 4B:
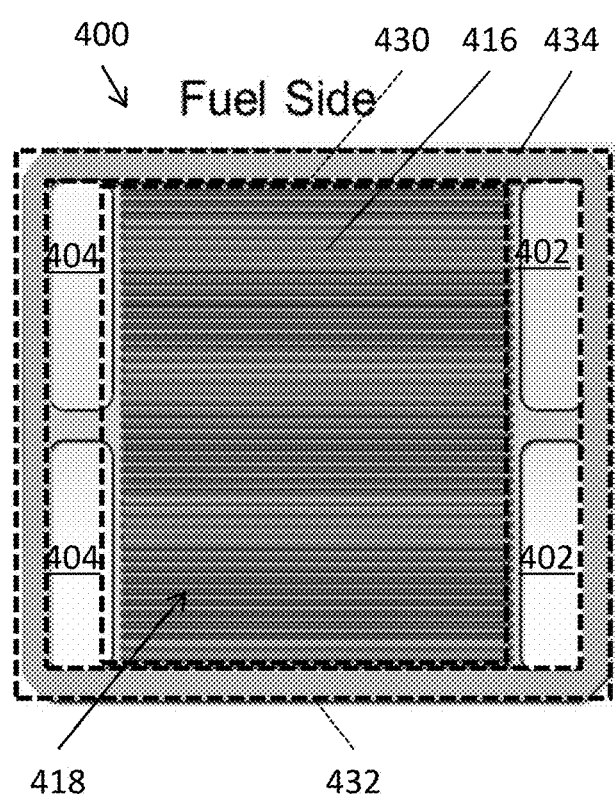

FIGS. 4A and 4B are plan views showing, respectively, an air side and a fuel side of the cross-flow interconnect 400, according to various embodiments of the present disclosure.

Referring to FIG. 4A, the air side of the interconnect 400 may include ribs 406 configured to at least partially define air channels 408 configured to provide air to the cathode of a fuel cell 310 disposed thereon. The air side of the interconnect 400 may be divided into an air flow field 420 including the air channels 408, and riser seal surfaces 422 disposed on two opposing sides of the air flow field 420. One of the riser seal surfaces 422 may surround the fuel inlets 402 and the other riser seal surface 422 may surround the fuel outlets 404. The air channels 408 and ribs 406 may extend completely across the air side of the interconnect 400, such that the air channels 408 and ribs 406 terminate at opposing peripheral edges of the interconnect 400. In other words, when assembled into a column 200, opposing ends of the air channels 408 and ribs 406 are disposed on opposing (e.g., front and back) outer surfaces of the stack, to allow the blown air to flow through the stack. Therefore, the stack may be externally manifolded for air.

Riser seals 424 may be disposed on the riser seal surface 422. For example, one riser seal 424 may surround the fuel inlets 402, and one riser seal 424 may surround the fuel outlets 404. The riser seals 424 may prevent fuel and/or anode exhaust from entering the air flow field 420 and contacting the cathode of the fuel cell 310. The riser seals 424 may also operate to prevent fuel from leaking out of the fuel cell stack 100 (see FIG. 3A).

Referring to FIG. 4B, the fuel side of the interconnect 400 may include ribs 416 that at least partially define fuel channels 418 configured to provide fuel to the anode of a fuel cell 310 disposed thereon. The fuel side of the interconnect 400 may be divided into a fuel flow field 430 including the fuel channels 418, and a perimeter seal surface 432 surrounding the fuel flow field 430 and the fuel inlets and outlets 402, 404. The ribs 416 and fuel channels 418 may extend in a direction that is perpendicular or substantially perpendicular to the direction in which the air-side channels 408 and ribs 406 extend.

A frame-shaped perimeter seal 434 may be disposed on the perimeter seal surface 432. The perimeter seal 434 may be configured to prevent air entering the fuel flow field 430 and contacting the anode on an adjacent fuel cell 310. The perimeter seal 434 may also operate to prevent fuel from exiting the fuel risers 403, 405 and leaking out of the fuel cell column 200 (see FIGS. 3A and 3B).

The seals 424, 434 may comprise a glass or ceramic seal material. The seal material may have a low electrical conductivity. In some embodiments, the seals 424, 434 may be formed by printing one or more layers of seal material on the interconnect 400, followed by sintering.

Fuel Flow Structures

As shown in FIG. 1A, in a conventional fuel cell system, fuel and fuel exhaust are provided to and received from a fuel cell stack through metal anode splitter plates 36. The anode splitter plates 36 which are fluidly connected to one another by the fuel inlet conduit 32 and the anode exhaust conduit 34. The conduits 32, 34 include metal tubes that are welded to the anode splitter plates 36 and to ceramic components that serve as dielectric breaks. As such, fluidly connecting the anode splitter plates 36 relies upon expensive dielectric components and a significant amount of on-site welding. Therefore, there is a need for a more cost effective method for providing fuel to, and receiving fuel exhaust from, a fuel cell stack.

Figure 5A:
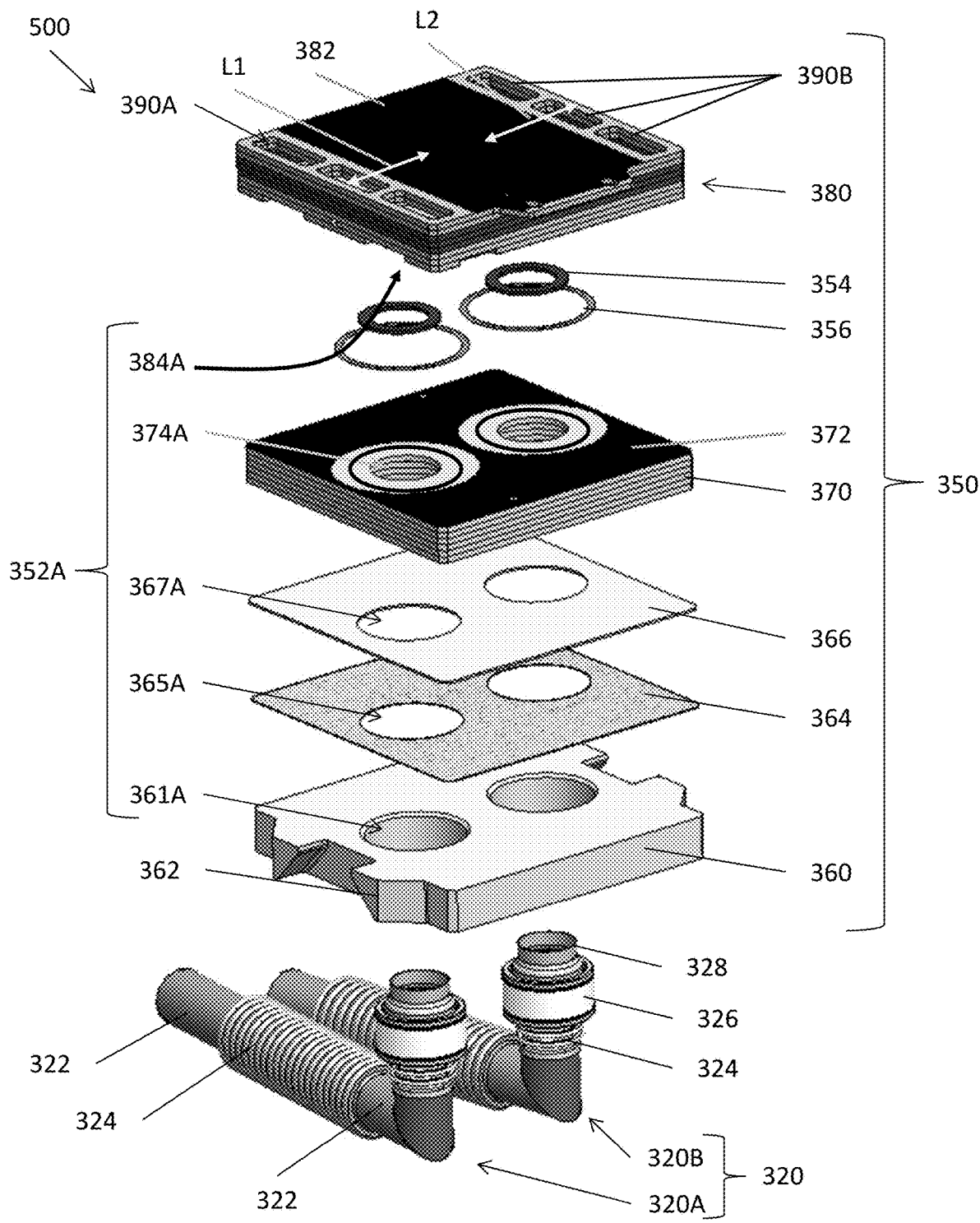
FIG. 5A is an exploded top perspective view of a fuel flow structure, according to various embodiments of the present disclosure.
Figure 5B:
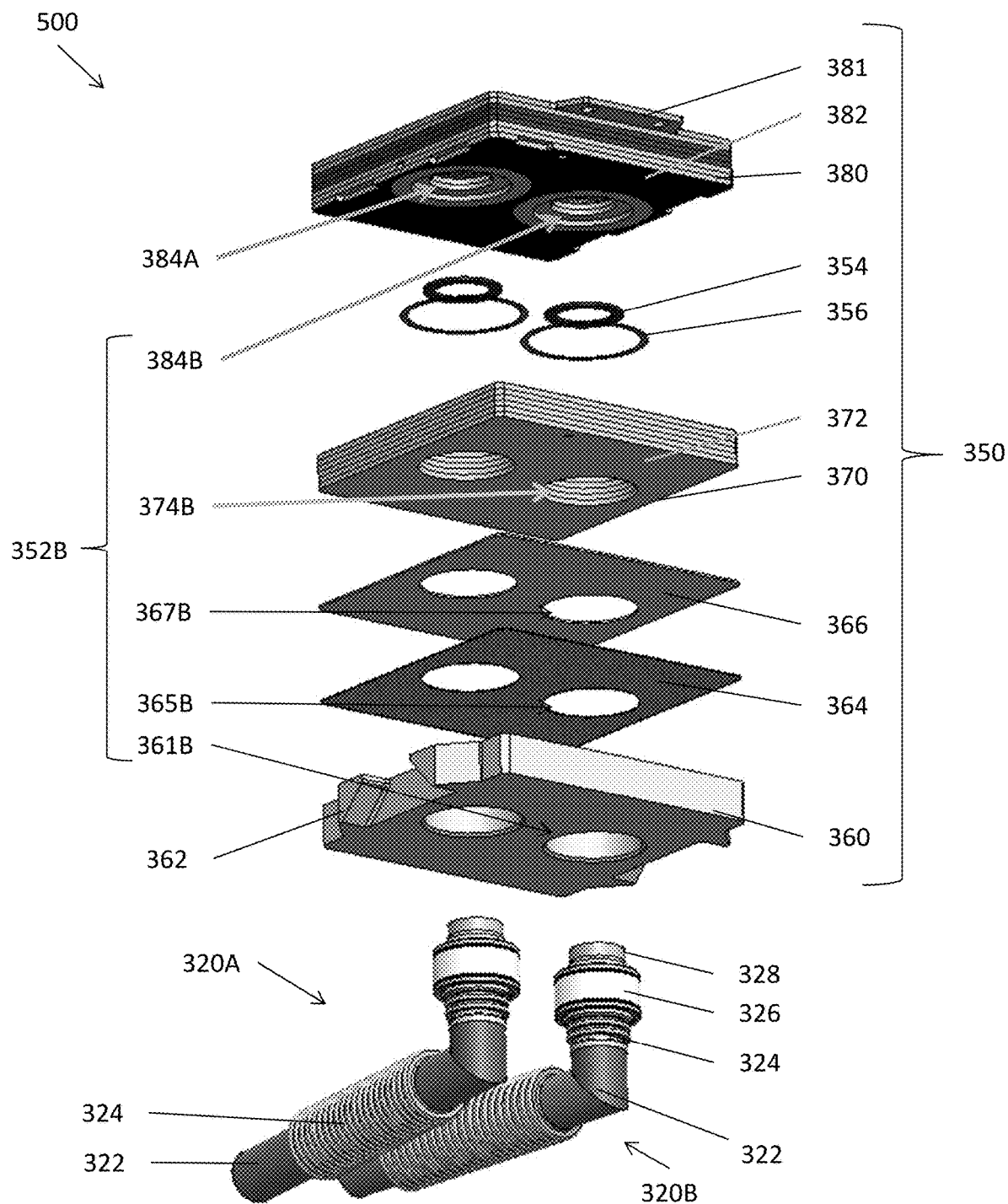
FIG. 5B is an exploded bottom perspective view of the fuel flow structure of FIG. 5A.

FIG. 5A is an exploded top perspective view of a fuel flow structure 500, according to various embodiments of the present disclosure, and FIG. 5B is an exploded bottom perspective view of the fuel flow structure 500 of FIG. 5A. Referring to FIGS. 5A and 5B, the fuel flow structure 500 includes fuel conduits 320 and a fuel plenum 350. The fuel plenum 350 may include a seal ring 354, glass or glass ceramic seals 356, a base plate 360, a dielectric layer 364, a cover plate 366, a seal plate 370, and a manifold plate 380.

The fuel plenum 350 may be configured to form a fluid-tight connection with the fuel conduits 320. The fuel conduits 320 may include an inlet conduit 320A configured to provide fuel to the fuel plenum 350, and an outlet conduit 320B configured to receive fuel exhaust from the fuel plenum 350. The fuel conduits 320 may include metal tubes 322, metal bellows 324, and dielectric rings 326. The metal tubes 322 may be coupled to the bellows 324 and the dielectric rings 326 by brazing, welding, or press-fitting, for example. The bellows 324 may act to compensate for differences in coefficients of thermal expansion between fuel cell components by deforming to absorb stress. In alternate embodiments, the metal tubes 322 may themselves include, or be made entirely of bellows, rather than be coupled with the bellows 324 such that the metal tubes/bellows 322 may be directly coupled with the dielectric ring 326. The dielectric rings 326 may operate as dielectric breaks, to prevent current from being conducted through the fuel conduits 320 and electrically shorting a fuel cell stack disposed on the fuel plenum 350.

The base plate 360, dielectric layer 364, and cover plate 366 may respectively include inlet holes 361A, 365A, 367A and outlet holes 361B, 365B, 367B, which may be through-holes that extend through the respective plates and layer. The base plate 360 may include protrusions 362 configured to mate with ceramic connectors 39, as shown in FIG. 1A. The base plate 360 and the cover plate 366 may be formed of a densified dielectric material. For example, the base plate 360 and the cover plate 366 may be formed of a substantially non-porous, electrically-insulating ceramic material, such as alumina, zirconia, yttria stabilized zirconia (YSZ) (e.g., 3% yttria stabilized zirconia), or the like. The base plate 360 and the cover plate 366 may be rigid plates configured to provide support to the dielectric layer 364.

In some embodiments, the dielectric layer 364 may be formed of a ceramic material having a higher dielectric constant than the ceramic materials of the base plate 360 and/or the cover plate 366. In other words, the dielectric layer 364 may be able to withstand a higher maximum electric field without electrical breakdown and becoming electrically conductive (i.e., have a higher breakdown voltage) than the base plate 360 and the cover plate 366. For example, the dielectric layer 364 may be formed of one or more layers of a porous ceramic yarn or fabric that is highly electrically insulating at high temperatures, such as Nextel ceramic fabrics numbers 312, 440 or 610, available from 3M Co.

In other embodiments, the dielectric layer 364 may be formed of a ceramic matrix composite (CMC) material, or any comparable material that has high dielectric strength, due to having a high surface area to volume ratio. The CMC may include, for example, a matrix of aluminum oxide (e.g., alumina), zirconium oxide or silicon carbide. Other matrix materials may be selected as well. The fibers may be made from alumina, carbon, silicon carbide, or any other suitable material. In one embodiment, both matrix and fibers may comprise alumina. Accordingly, the dielectric layer 364 may be configured to operate as a dielectric break to prevent electrical conduction through the fuel plenum 350.

The cover plate 366 and the base plate 360 may have a higher density than the dielectric layer 364. For example, the cover plate 366 and/or the base plate 360 may be formed of a fully dense ceramic material, such as 97% to 99.5% dense alumina, or the like. The cover plate 366 is configured to separate the seal plate 370 from the dielectric layer 364. As such, the cover plate 366 may be configured to prevent the diffusion of metallic species from the seal plate 370 into the dielectric layer 364. For example, the cover plate 366 may reduce and/or prevent the diffusion of chromium species (e.g., chromium oxides) from the seal plate 370 into the dielectric layer 364, in order to prevent the chromium species from reducing the dielectric strength of the dielectric layer 364 and/or otherwise degrading the structural integrity of the dielectric layer 364.

The seal plate 370 and the manifold plate 380 may be formed of a metal or metal alloy, such as stainless steel, that may be easily welded to the fuel conduits 320. For example, the seal plate 370 and/or the manifold plate 380 may be formed of 446 stainless steel or the like. 446 stainless steel includes 23 to 27 weight % Cr, 1.5 weight % or less Mn, 1 weight % or less of one or more of Si, Ni, C, P and/or S, and balance Fe. In some embodiments, the seal plate 370 and/or the manifold plate 380 may be formed by brazing multiple metal sub-plates together. In embodiments formed using metal sub-plates, each of the sub-plates may be cut to form various structures, such as holes and/or channels, prior to, or after, the brazing process. In some embodiments, laser cutting or the like may be used to cut such structures.

The seal plate 370 and the manifold plate 380 may respectively include coatings 372, 382 on one or both sides, such as at least on the sides of the plates 370, 380 that face each other. The coatings 372, 382 may have a thickness ranging from about 75 µm to about 200 µm, such as from about 100 µm to about 175 µm, from about 110 µm to about 140 µm, or about 120 µm. Typically, the coatings 372, 382 may comprise a metal oxide material, such as a perovskite material, for example, lanthanum strontium manganite (LSM). Alternatively, other metal oxide coatings, such as a spinel, such as an $(Mn, Co)_3O_4$ spinel (MCO), can be used instead of or in addition to LSM. Any spinel having the composition $Mn_{2-x}Co_{1+x}O_4$ ($0 \leq x \leq 1$) or written as $z(Mn_3O_4)+(1-z)(Co_3O_4)$, where ($\frac{1}{3} \leq z \leq \frac{2}{3}$) or written as $(Mn, Co)_3O_4$ may be used. In other embodiments, a mixed layer of LSM and MCO, or a stack of LSM and MCO layers may be used as the coatings 372, 382. The coatings 372, 382 may be formed using a spray coating or dip coating process and may be applied to substantially all the outer surfaces of the seal plate 370 and the manifold plate 380.

The seal plate 370 may include an inlet hole 374A and an outlet hole 374B, which may be through-holes that extend between top and bottom surfaces thereof. The manifold plate 380 may include a bottom inlet hole 384A and a bottom outlet hole 384B formed in the bottom surface thereof, and top inlet holes 390A and top outlet holes 390B, which may be formed in the top surface thereof, on opposing sides of the manifold plate 380. While three top inlet holes 390A and three top outlet holes 390B are shown, the present disclosure is not limited to any particular number of top outlet and inlet holes 390A, 390B. For example, the manifold plate 380 may include two, four, five or more top inlet holes 390A, and may include two, four, five or more top outlet holes 390B, depending on a number of fuel inlets and outlets included in the interconnects 400 of a corresponding fuel cell stack. For example, if the interconnects has three inlets and three outlets, then the manifold plate 380 has three inlet holes 390A and three outlet holes 390B.

The base plate 360, dielectric layer 364, cover plate 366, seal plate 370, and manifold plate 380 may be stacked on one another, such that the inlet holes 361A, 365A, 367A, 374A, 384A are aligned to form an inlet conduit passage 352A, and the outlet holes 361B, 365B, 367B, 374B, 384B are aligned to form an outlet conduit passage 352B. The inlet and outlet conduits 320A, 320B may be inserted into the respective inlet and outlet conduit passages 352A, 352B such that ends 328 of the inlet and outlet conduits 320A, 320B may extend up to and/or past the top surface of the seal plate 370.

Figure 6A:
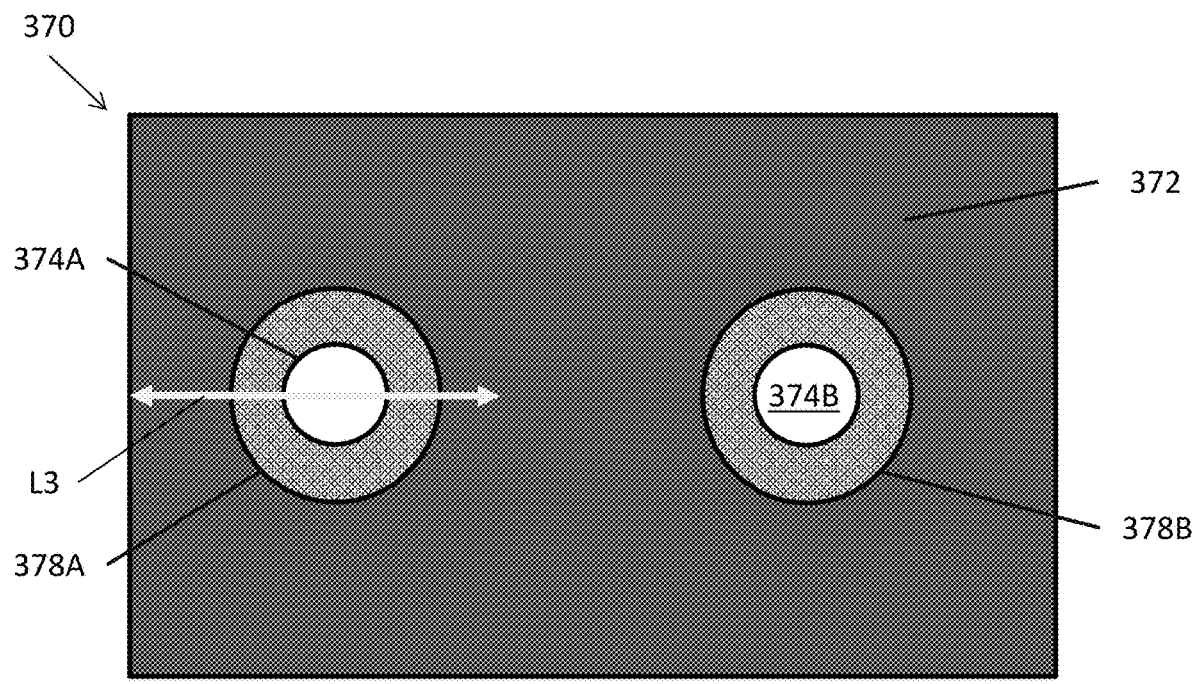
FIG. 6A is a top view of a seal plate of FIGS. 5A and 5B.
Figure 6B:
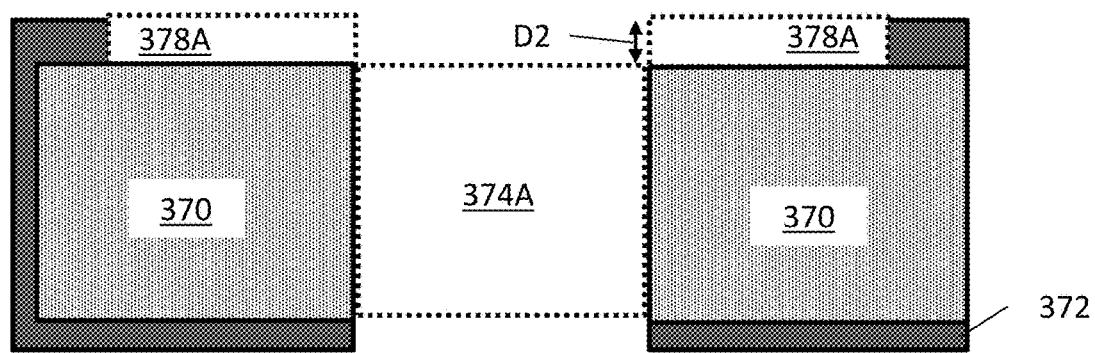
FIG. 6B is a cross-sectional view taken along line L3 of FIG. 6A.

FIG. 6A is a top view of the seal plate 370, and FIG. 6B is a cross-sectional view taken along line L3 of FIG. 6A. Referring to FIGS. 6A and 6B, an inlet seal region 378A and an outlet seal region 378B may be respectively formed around the inlet hole 374A and an outlet hole 374B in areas where the coating 372 is not applied to the top surface of the seal plate 370. As such, the inlet and outlet seal regions 378A, 378B may have a depth D2 equal to the thickness of the coating 372, such as a depth D2 of about 120 µm.

Figure 7A:
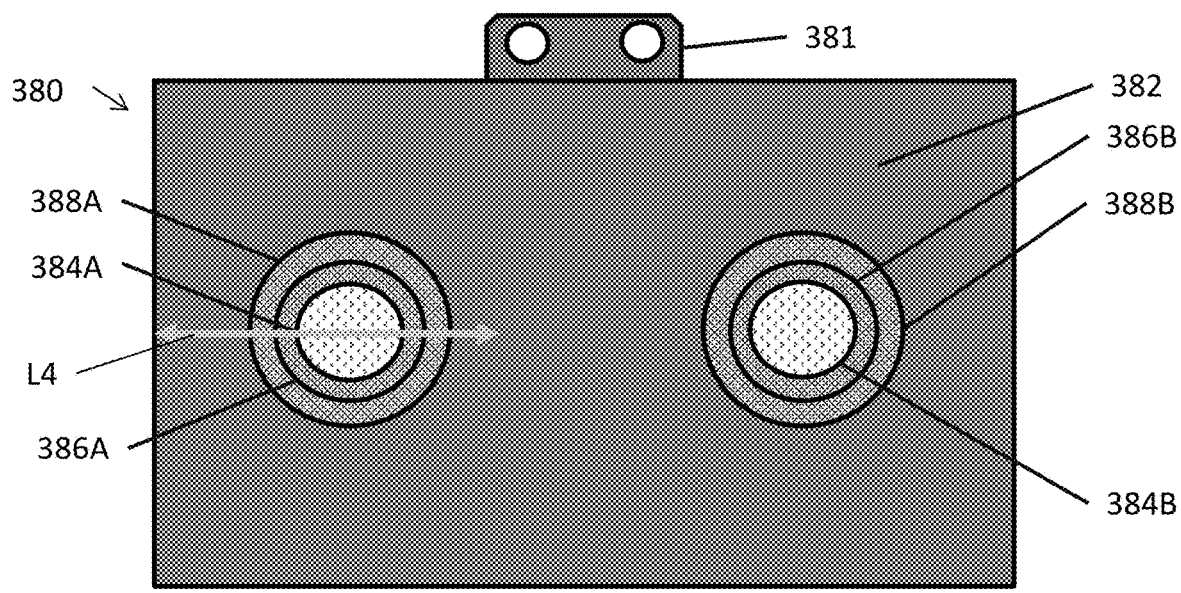
FIG. 7A is a bottom view of a manifold plate of FIGS. 5A and 5B.
Figure 7B:
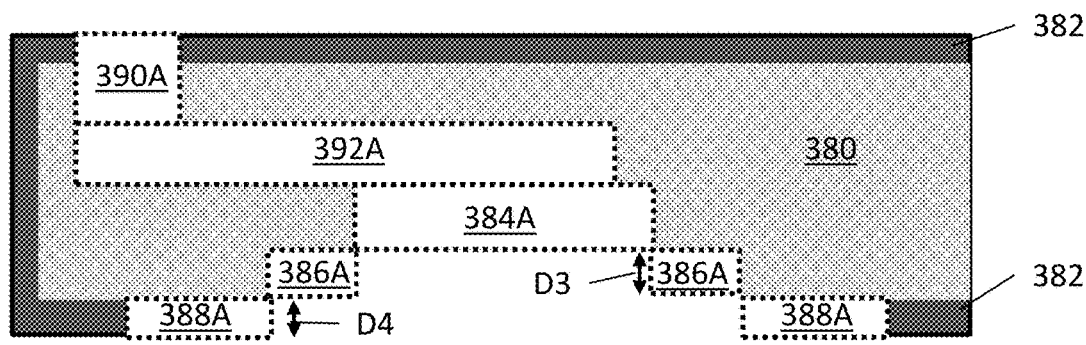
FIG. 7B is a cross-sectional view taken along line L4 of FIG. 7A.
Figure 7C:
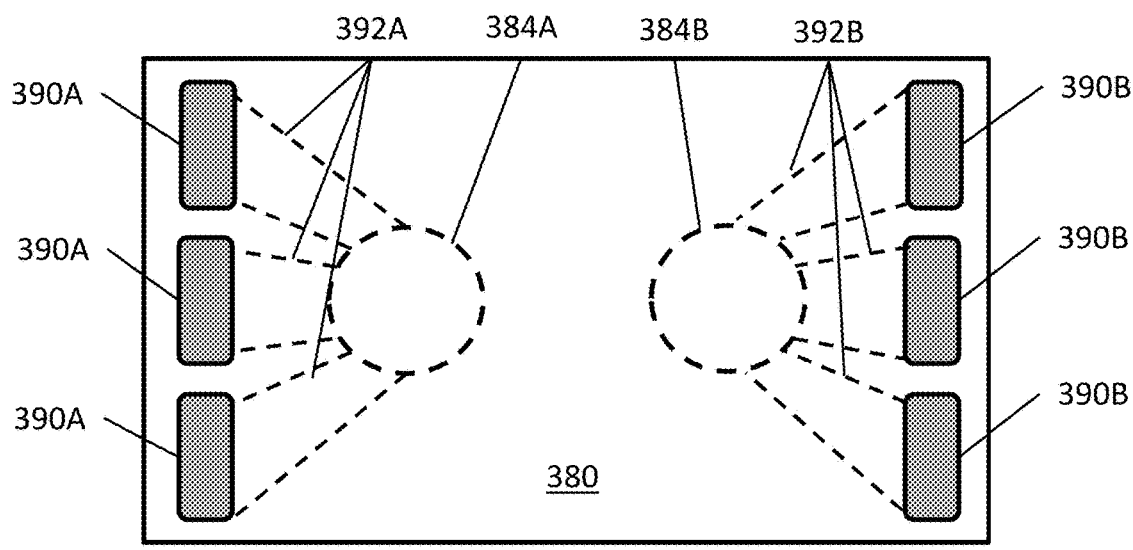
FIG. 7C is a schematic top view of the manifold plate of FIG. 7A.

FIG. 7A is a bottom view of the manifold plate 380, FIG. 7B is a cross-sectional view taken along line L4 of FIG. 7A, and FIG. 7C is a schematic top view of the manifold plate 380, according to various embodiments of the present disclosure. Referring to FIGS. 7A-7C, inlet and outlet recesses 386A, 386B may be formed in the bottom surface of the manifold plate 380, respectively surrounding the bottom inlet and outlet holes 384A, 384B. The inlet and outlet recesses 386A, 386B may have a depth D3 ranging from about 0.5 mm to about 6 mm.

Inlet and outlet seal regions 388A, 388B may be respectively formed around the inlet and outlet recesses 386A, 386B, in areas where the coating 382 is not applied to the bottom surface of the manifold plate 380. As such, the inlet and outlet seal regions 388A, 388B may have a depth D4 equal to the thickness of the coating 382, such as a depth D4 of about 120 µm.

The manifold plate 380 may also include internal inlet channels 392A and outlet channels 392B. The inlet channels 392A may fluidly connect the bottom inlet hole 384A to respective top inlet holes 390A. The outlet channels 392B may fluidly connect the bottom outlet hole 384B to respective top outlet holes 390B. The inlet channels 392A may be configured such that substantially equal amounts of fuel (e.g., equal fuel flow rates) are provided to each top inlet hole 390A from the common bottom inlet hole 384A. The outlet channels 392B may be configured such that substantially equal amounts of fuel exhaust are provided from each top outlet hole 390B to the common bottom outlet hole 384B.

In addition, the manifold plate 380 may include an electrical contact 381. The manifold plate 380 may be electrically connected to the bottom of a fuel cell stack, and the electrical contact 381 may extend laterally from the manifold plate 380 and may be configured to provide a connection point for connecting the manifold plate 380 to a current collection circuit.

Figure 8A:
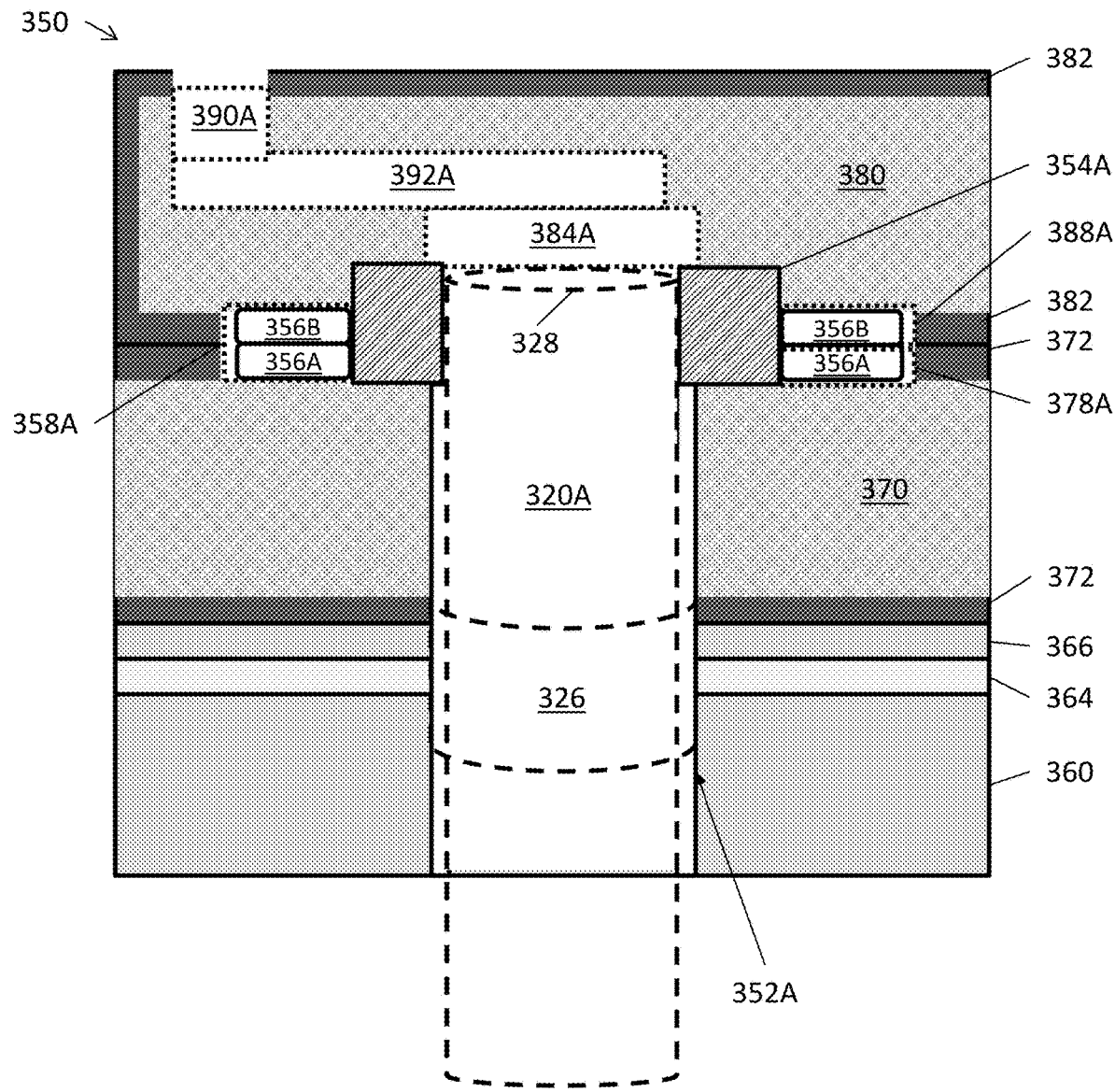
FIG. 8A is a vertical cross-sectional view taken along line L1 of FIG. 5A, showing an assembled fuel plenum and inlet conduit.
Figure 8B:
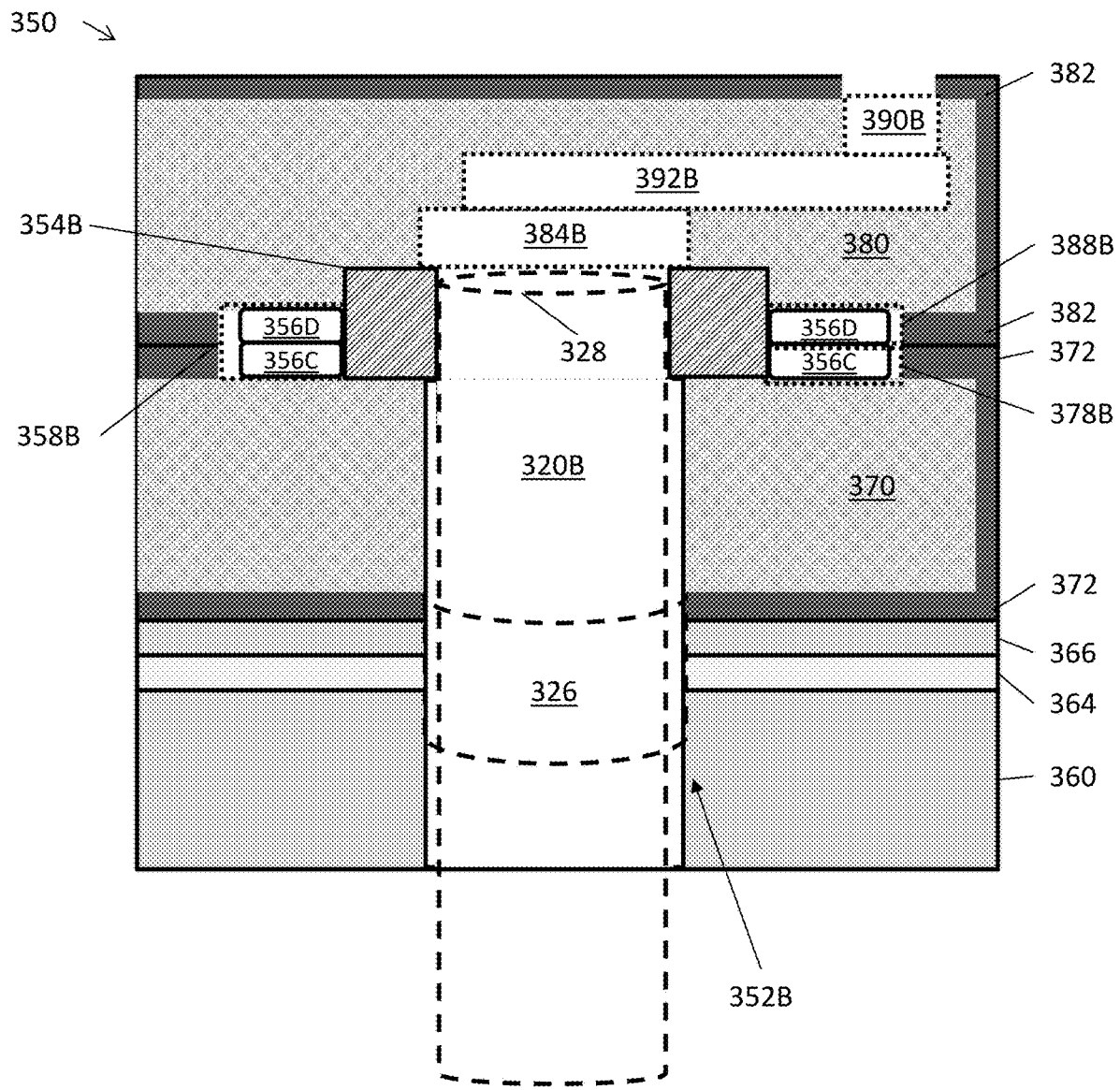
FIG. 8B is a vertical cross-sectional view or along line L2 of FIG. 5A, showing the assembled fuel plenum and outlet conduit.

FIG. 8A is a vertical cross-sectional view taken along line L1 of FIG. 5A, showing the assembled fuel plenum 350 and inlet conduit 320A, and FIG. 8B is a vertical cross-sectional view or along line L2 of FIG. 5A, showing the assembled fuel plenum 350 and outlet conduit 320B.

Referring to FIGS. 5A, 5B, 8A, and 8B, the base plate 360, dielectric layer 364, cover plate 366, seal plate 370, and manifold plate 380 are stacked on one another, thereby forming the inlet conduit passage 352A and the outlet conduit passage 352B. The inlet conduit 320A may be inserted in the inlet conduit passage 352A, facing the bottom inlet hole 384A. The outlet conduit 320B may be inserted in the outlet conduit passage 352B, facing the bottom outlet hole 384B.

A first seal ring 354A may be disposed in the inlet recess 386A on the bottom surface of the manifold plate 380 and around the inlet conduit 320A. A second seal ring 354B may be disposed in the outlet recess 386B on the bottom surface of the manifold plate 380 and around the outlet conduit 320B. The inlet and outlet conduits 320A, 320B may be welded to the seal plate 370. In particular, the welding process may include welding the first and second seal rings 354A, 354B to the inlet and outlet conduits 320A, 320B, and welding the first and second seal rings 354A, 354B to the surface of the seal plate 370 to ensure that a fluid-tight seal is formed between the inlet and outlet conduits 320A, 320B and the seal plate 370.

A first glass or glass ceramic seal 356A may be disposed in the inlet seal region 378A of the seal plate 370, and a second glass or glass ceramic seal 356B may be disposed in the inlet seal region 388A of the manifold plate 380. A third glass or glass ceramic seal 356C may be disposed in the outlet seal region 378B of the seal plate 370, and a fourth glass or glass ceramic seal 356D may be disposed in the outlet seal region 388B of the manifold plate 380. However, in other embodiments, a single glass or glass ceramic seal may be used. The seals 356A-356D may be heated to soften the seals 356A-356D, such that the seals 356A-356D form a fluid-tight connections that physically connect the seal plate 370 to the manifold plate 380.

The inlet seal regions 378A, 388A may overlap to form an inlet seal area 358A, and the outlet seal regions 378B, 388B may overlap to form an outlet seal area 358B. The first and second seals 356A, 356B may be stacked on one another in the inlet seal area 358A, and the third and fourth seals 356C, 356D may be stacked on one another in the outlet seal area 358B. The coatings 372, 382 may be stacked on one another. As such, the height of the inlet and outlet seal areas 358A, 358B may be equal to the combined thickness of the coatings 372, 382.

The inlet and outlet seal areas 358A, 358B may provide space for the glass or glass ceramic seals 356A-356D to expand laterally when heated to fuel cell system operating temperatures, thereby reducing stress applied to the glass or glass ceramic seals 356A-356D over time. In addition, since the seal plate 370 and the manifold plate 380 may be formed of the same materials, the seal plate 370 and the manifold plate 380 may have matched coefficients of thermal expansion (CTEs). Therefore, stress applied to the glass or glass ceramic seals 356A-356D over time may be further reduced.

The glass or glass ceramic seals 356A-356D may be formed of a high-temperature glass or glass ceramic material, such as a silicate or aluminosilicate glass or glass ceramic material. In some embodiments, the glass or glass ceramic seals 356A-356D may be formed of a silicate glass or glass ceramic seal material comprising $SiO_2$, BaO, CaO, $Al_2O_3$, $K_2O$, and/or $B_2O_3$. For example, the seal material may include, by weight: $SiO_2$ in an amount ranging from about 40% to about 60%, such as from about 45% to about 55%; BaO in an amount ranging from about 10% to about 35%, such as from about 15% to about 30%; CaO in an amount ranging from about 5% to about 20%, such as from about 7% to about 16%; $Al_2O_3$ in an amount ranging from about 10% to about 20%, such as from about 13% to about 15%; and $B_2O_3$ in an amount ranging from about 0.25% to about 7%, such as from about 0.5% to about 5.5%. In some embodiments, the seal material may additionally include $K_2O$ in an amount ranging from about 0.5% to about 1.5%, such as from about 0.75% to about 1.25%.

In some embodiments, the glass or glass ceramic seals 356A-356D may be formed of a silicate glass or glass ceramic seal material comprising $SiO_2$, $B_2O_3$, $Al_2O_3$, CaO, MgO, $La_2O_3$, BaO, and/or SrO. For example, the seal material may include, by weight: $SiO_2$ in an amount ranging from about 30% to about 60%, such as from about 35% to about 55%; $B_2O_3$ in an amount ranging from about 0.5% to about 15%, such as from about 1% to about 12%; $Al_2O_3$ in an amount ranging from about 0.5% to about 5%, such as from about 1% to about 4%; CaO in an amount ranging from about 2% to about 30%, such as from about 5% to about 25%; MgO in an amount ranging from about 2% to about 25%, such as from about 5% to about 20%; and $La_2O_3$ in an amount ranging from about 2% to about 12%, such as from about 5% to about 10%. In some embodiments, the seal material may additionally include BaO in an amount ranging from about 0% to about 35%, such as from about 0% to about 30%, or from about 0.5% to about 30%, including about 20% to about 30%, and/or SrO in an amount ranging from about 0% to about 20%, such as from about 0% to about 15%, of from about 0.5% to about 15%, including about 10% to about 15%. In some embodiments, the seal material may additionally include at least one of BaO and/or SrO in a non-zero amount such as at least 0.5 wt. %, such as both of BaO and SrO in a non-zero amount, such at least 0.5 wt. %. However, other suitable seal materials may be used.

When assembled in a fuel cell stack, such as the fuel cell column 200 of FIGS. 3A-3C, the top inlet holes 390A may be fluidly connected to the fuel inlets 402 of the interconnect 400 of the column 200, and the top outlet holes 390B may be fluidly connected to the fuel outlets 404 of the interconnects 400, as shown in FIG. 4A. For example, a glass or glass ceramic seal 424 may be disposed between the top inlet holes 390A and the fuel inlets 402 of an adjacent interconnect 400, and a glass or glass ceramic seal 424 may be disposed between the top outlet holes 390B and the fuel outlets 404 of the adjacent interconnect 400, in order to provide fluid-tight connections.

While solid oxide fuel cells are described above in various embodiments, embodiments can include any other fuel cells, such as molten carbonate, phosphoric acid or PEM fuel cells.

Figure 9A:
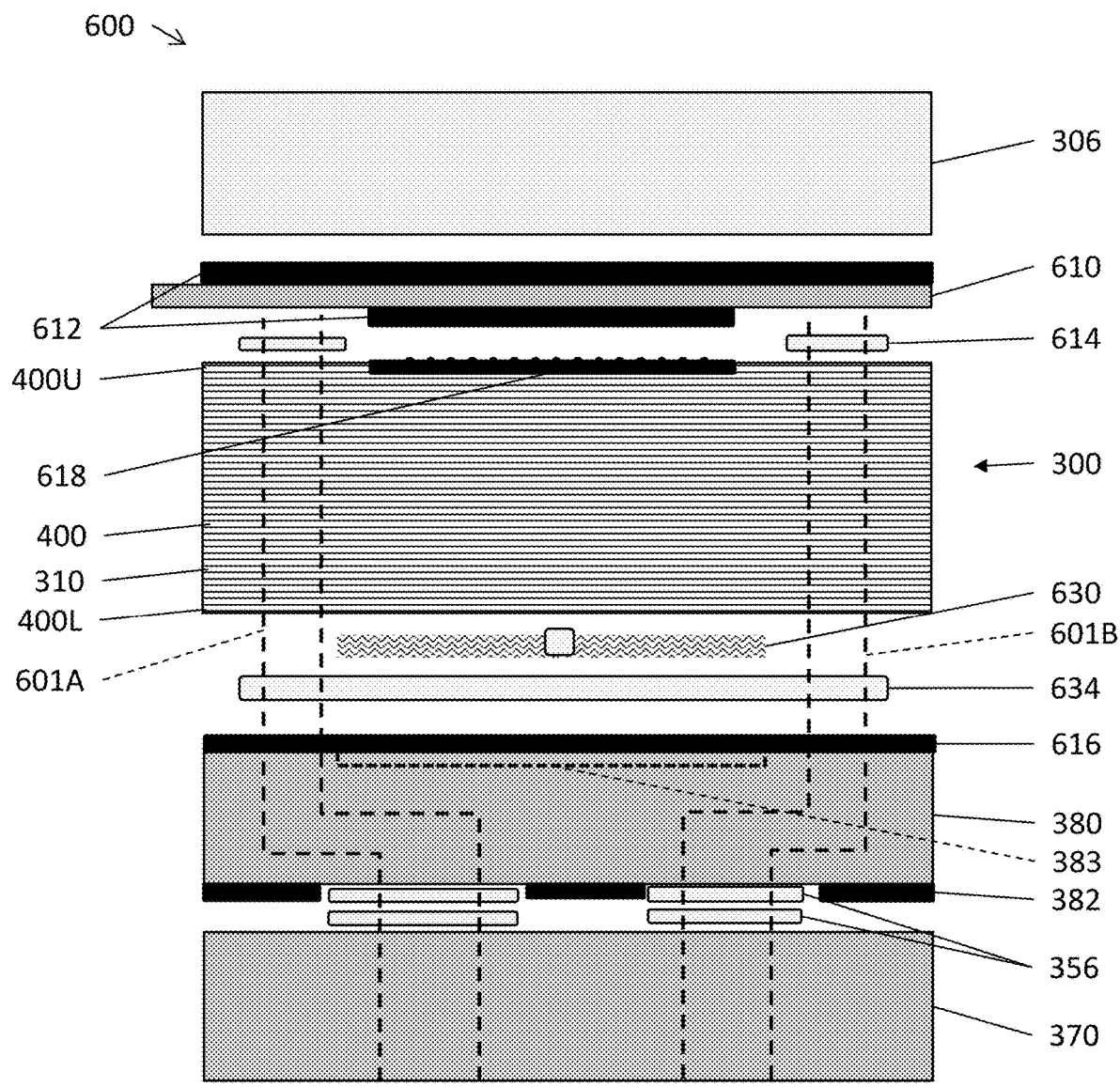
FIG. 9A is a simplified exploded side view of a fuel cell column, according to various embodiments of the present disclosure.

FIG. 9A is a simplified exploded side view of a fuel cell column 600, according to various embodiments of the present disclosure. Referring to FIG. 9A, the column 600 may include a fuel cell stack 300, a top termination plate 610, a seal plate 370, a manifold plate 380, and a compression assembly 306. Although not shown in FIG. 9A, the column 600 may include other components, such as baffle plates 302, a base plate 360, dielectric layers 364, and a cover plate 366, as shown in the FIGS. 3A, 5A, and 5B.

Figure 12:
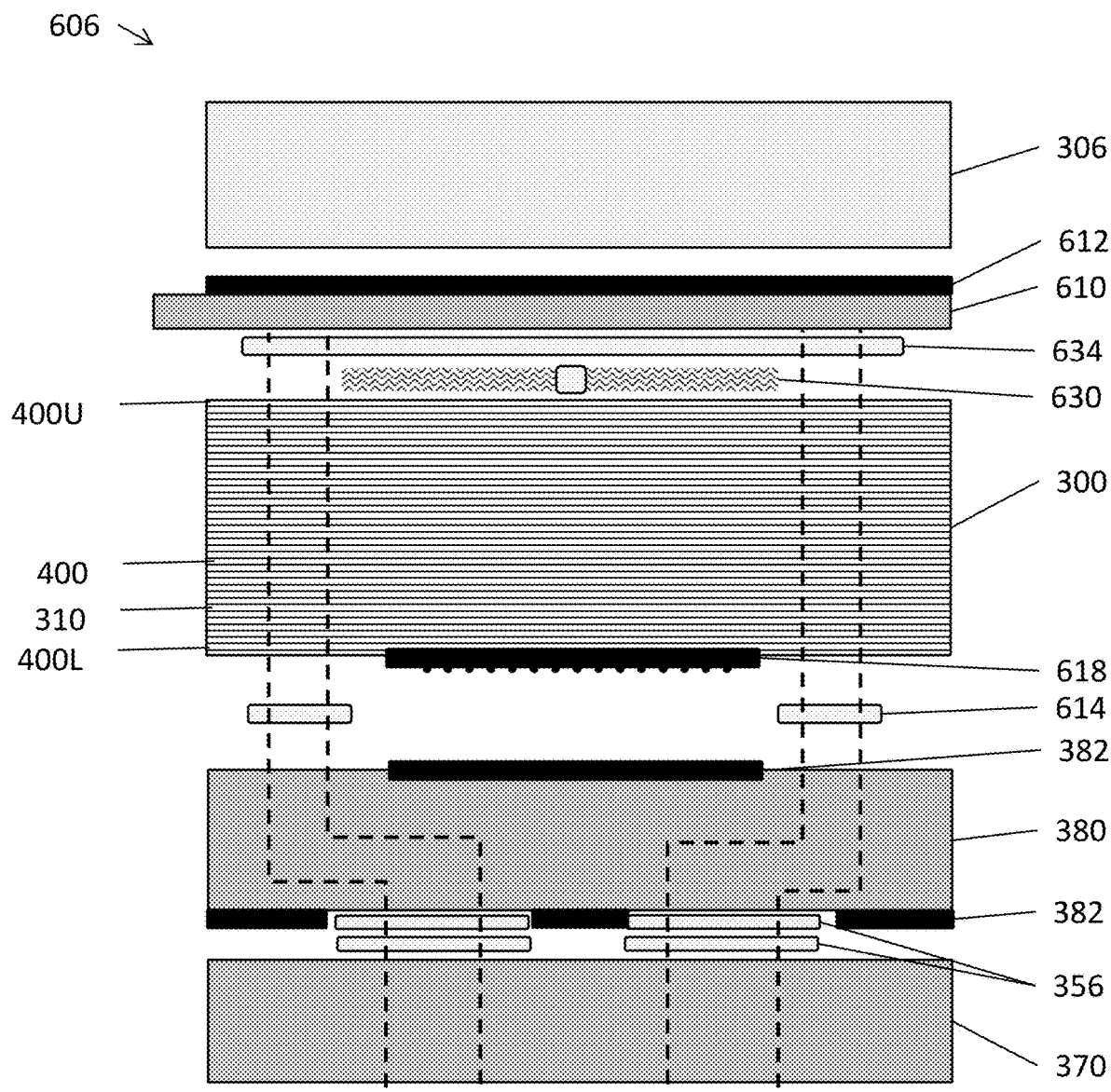

The fuel cell stack 300 may include fuel cells 310 separated by interconnects 400. The fuel cells and interconnects 400 may be arranged in an "even" configuration shown in FIG. 9A, where fuel cells of the stack 300 are arranged cathode side up (i.e., air sides of the interconnects 400 face the top termination plate 610 and fuel sides of the interconnects 400 face the manifold plate 380). In contrast, a stack having an "odd" configuration includes fuel cells arranged anode side up (i.e., fuel sides of the interconnects 400 face the top termination plate 610 and air sides of the interconnects 400 face the manifold plate 380), as shown in FIG. 12. The top termination plate 610 of a first stack 300 in the "even" configuration in a first column 600 may be electrically connected by a conductive jumper or wire to the top termination plate 610 of a second stack 300 in the "odd" configuration in a laterally adjacent second column 600. The manifold plates 380 of the first and second columns 600 may be electrically connected to respective positive and negative electrical terminals of the system.

The top termination plate 610 disposed between the stack 300 and the compression assembly 306. The top termination plate 610 may be bonded to an uppermost interconnect 400U of the stack 300 by manifold seals 614, which may be ring-shaped glass or glass-ceramic seals similar to the seals 424 described above. The top termination plate 610 may be form by the same processes and materials as the interconnects 400. For example, the top termination plate 610 may be formed of a Cr—Fe alloy by a power metallurgy process.

The top and bottom surfaces of the top termination plate 610 may be coated with a protective coating 612, in order to decrease the growth rate of a chromium oxide surface layer on the interconnect and to suppress evaporation of chromium vapor species which can poison the fuel cell cathode. The coating 612 may have a thickness ranging from about 40 μm to about 90 μm, such as from about 50 μm to about 80 μm, or about 65 μm. The coating 612 may comprise a perovskite material, such as lanthanum strontium manganite (LSM). The coating 612 may be formed using dip coating or a spray coating process, such as an atmospheric plasma spraying ("APS") or thermal spraying. Alternatively, other metal oxide coatings, such as a spinel, such as a (Mn, Co)$_3$O$_4$ spinel (MCO), can be used instead of or in addition to LSM. Any spinel having the composition $Mn_{2-x}Co_{1+x}O_4$ (0≤x≤1) or written as $z(Mn_3O_4)+(1-z)(Co_3O_4)$, where (⅓≤z≤⅔) or written as (Mn, Co)$_3$O$_4$ may be used. In other embodiments, a mixed layer of LSM and MCO, or a stack of LSM and MCO layers may be used as the coating 612.

A protective coating 618 may be formed on the top surface of an uppermost interconnect 400U of the stack 300. The coating 618 may be formed of the same material as the coating 612 of the top termination plate 610. In some embodiments, the coating 618 may be formed by APS or contact printing and may have a thickness ranging from about 10 μm to about 50 μm, such as from about 20 μm to about 40 μm, or about 30 μm. For example, the coating 618 may have the same area and perimeter (i.e., outer horizontal shape) as the coating 612 on the bottom of the top termination plate 610, which may have the same area and perimeter as the fuel cells of the stack 300.

The manifold plate 380 may be disposed between the seal plate 370 and the stack 300. A protective coating 382 may be formed on the bottom surface of the manifold plate 380. The coating 382 may be formed of the same material as the coating 612 of the top termination plate 610. The manifold plate 380 may be connected to the seal plate 370 using one or more seals 356, which may be formed of a glass or glass-ceramic seal material. For example, two ring-shaped seal 356, may be stacked on one another to seal fuel inlet and outlet holes of the manifold plate 380 and the seal plate 370. In some embodiments, the seals 356 may be tape cast seals having a thickness ranging from about 100 μm to about 300 μm, such as from about 150 μm to about 250 μm, or about 200 μm, prior to sintering and compression. In some embodiments, ceramic seals 354 may be disposed inside the ring seals 356, as shown in FIGS. 8A and 8B.

A lowermost interconnect 400L of the stack 300 may interface with the manifold plate 380. In particular, the lowermost interconnect 400L may be bonded to the manifold plate 380 by a peripheral seal 634. The peripheral seal 634 may be a frame-shaped seal formed by dispensing a green glass or glass-ceramic seal material around the perimeter of a conductive compliant layer 630. The green seal material may be cured by heat or UV light, for example. The compliant layer 630 may be formed of a conductive compliant metal material, such as a metal mesh, such as a nickel or nickel alloy mesh, and may be configured to electrically connect the lowermost interconnect 400L and the manifold plate 380. The compliant layer 630 may also be referred to herein as a "compliant metal mesh" or a "metal mesh".

In one embodiment, the compliant metal mesh may comprise an Inconel alloy, such as Inconel 625 alloy which includes between 20 and 23 wt. % Cr, between 8 and 10 wt. % Mo, between 3.15 and 4.15 wt. Nb+Ta, between 0 and 1 wt. % Co and balance Ni with background impurities (e.g., less than 1 wt. % Al, Ti, C, Fe, Mn, Si, P and/or S each).

The compliant metal mesh should have sufficient vertical compliance, electrical contact, and sufficient deformation under typical loads to support the stack in its cambered form. For example, the compliant metal mesh may include between 1.5 and 2.5 metal wires per millimeter (e.g., between 1.9 and 2.3 wires per mm), may have wire thickness between 125 and 200 microns (e.g., between 140 and 180 microns), and mesh thickness between 250 and 400 microns (e.g., between 280 and 350 microns).

If the mesh is too stiff (i.e., the compressibility is too low), then the number of knuckles (i.e., wire crossing locations where wires bend out of the plane of the mesh) may be reduced. For example, some of the knuckles may be intentionally skipped. For example, ever second, every third, every fourth, etc. knuckle may be skipped. Alternatively holes may be intentionally drilled or punched through the thickness of the mesh to reduce the number of knuckles. The holes may have a width (e.g., diameter for circular holes) that is at least four times larger than the spacing between the wires of the mesh. The holes may have any suitable shape (e.g., round, rectangular, irregular, etc.). The holes may be spaced at regular or irregular interval in the plane of the mesh. For example, the holes may take up between 10 and 30 percent of the total area of the mesh.

The column 600 may include a fuel inlet manifold 601A and a fuel outlet manifold 601B, which extend through openings formed in the seal plate 370, the manifold plate 380, and the stack 300. The top termination plate 610 may include channels that connect the manifolds 601A, 601B.

The manifold plate 380 may be made of 446 alloy stainless steel, for reasons of low cost, manufacturability (e.g., easy brazing and welding), and desirable material properties, such as oxidation resistance and fracture toughness. Interconnects 400 may be formed by compressing a metal alloy, such as an Cr—Fe alloy, via a powder metallurgy (PM) process, for reasons of low cost, minimal variability in critical properties (e.g., flow channel cross-sectional area), and precise match of coefficient of thermal expansion (CTE) to the fuel cell electrolyte.

The CTE of the manifold plate 380 may be close to the CTE of the interconnects 400. However, in some embodiments, the CTEs may not be precisely matched. As a result, during thermal cycling (e.g., shutdown/restart), thermal stress may build up between the manifold plate 380 and the stack 300, due to differing rates of thermal expansion between the manifold plate 380 and the interconnects 400 located at the bottom of the stack 300 near the manifold plate 380. This thermal stress may result in the fracturing of the peripheral seal 634, or more detrimentally the fracturing of a seal between adjacent interconnects 400 or the fracturing one of the fuel cells 310 at the bottom of the stack 300.

Furthermore, the shape (or "camber") of the manifold plate 380 and the interconnects 400 may not match. In addition, the camber of the manifold plate 380 may be essentially flat upon manufacture, but can change with time at temperature, and such changes may be influenced by many factors including material creep, the shape of the interconnects 400, the compressive load, and the internal structure of the manifold plate 400. The camber of the interconnects 400 may be nonzero upon manufacture, and can also change with time, influenced by the same factors as the manifold plate 380, as well as the hydrogen and water content of the fuel flow. Difference in the camber of the interconnects 400 and manifold plate 380 may also result in seal and/or fuel cell cracking/damage. This shape mismatch can also result in uneven electrical contact within cells 310 at the bottom of the stack 300, which may result in poor cell performance, and/or poor contact to the manifold plate 380, resulting in resistive losses at the termination plates or current collectors. Shaping the manifold plate 380 may be complex and expensive, and may not account for all interconnect 400 shapes.

Therefore, various embodiments may include a mitigation structure configured to reduce stress applied to the stack 300, due to a shape mismatch and/or coefficient of thermal expansion mismatch, between the stack 300 and the manifold plate 380. The mitigation structure may also be configured to reduce electrical disconnections between the stack 300 and the manifold plate 380.

For example, in some embodiments, the thickness (i.e., height) of the peripheral seal 634 may be increased so as to be greater than the thicknesses of the other seals in the column 600 (e.g., thicker than the seals inside the stack 300). Without wishing to be bound to a particular theory, it is believed that the seal stress is a function of seal thickness. If the peripheral seal 634 is the thickest seal in the column 600, then then peripheral seal 634 should be the first to break due to thermal stress applied to the column 600. As such, the cracking of the peripheral seal 634 may relieve thermal stress and prevent damage to adjacent fuel cells 310 and/or seals inside the stack 300.

In various embodiments, the peripheral seal 634 may be formed of a compliant seal material, such as vermiculite, mica, or a glass-mica material, which may be in a glass ceramic configuration containing an amorphous glass matrix embedding ceramic crystals. This compliant seal material may allow for differing expansion rates between the lowermost interconnect 400L and the manifold plate 380, thereby preventing or reducing thermal stress buildup.

In other embodiments, the thickness of the compliant layer 630 may be increased to compensate for thermal stress. For example, the compliant layer 630 may be formed of a mesh with wire thickness ranging from about 80 μm to about 200 μm, such as from about of about 100 μm to about 150 μm. The thicker compliant layer 630 is used in combination with a thicker peripheral seal 634 which surrounds the compliant layer 630, and thus has about the same thickness as the compliant layer 630. Therefore, the thickness of the peripheral seal 634 may range from about 80 μm to about 200 μm, such as from about of about 100 μm to about 150 μm. In one embodiment, the peripheral seal 634 may comprise a UV curable seal material with a dispensed seal dam.

In some embodiments an optional recess 383 may be formed in the top surface of the manifold plate 380, to at least partially accommodate the increased thickness of the compliant layer 630. In particular, the recess 383 may have a depth ranging from about 100 µm to about 150 µm, such as about 120 µm. The compliant layer 630 may be located at least partially in the recess 383.

In various embodiments, an optional high-temperature tribological coating 616 may be deposited on the top surface of the manifold plate 380 and/or the bottom surface of the lowermost interconnect 400L. The tribological coating 616 may be configured to reduce friction between the manifold plate and the lowermost interconnect 400L, which may provide lower-friction sliding during thermal expansion, thereby further reducing the stress on the stack 300. The tribological coating 616 may be a dense and smooth coating comprising an electrically-insulating ceramic material, such as alumina, zirconia, YSZ, or the like, or a loose powder coating comprising a perovskite material, such as lanthanum strontium manganite (LSM), for example.

Accordingly, the column 600 may include a mitigation structure configured to reduce stress applied to the stack 300, due to a shape mismatch and/or coefficient of thermal expansion mismatch, between the stack 300 and the manifold plate 380. The mitigation structure may also be configured to reduce electrical disconnections between the stack 300 and the manifold plate 380. The mitigation structure may include the compliant layer 630, the peripheral seal 634, and/or the tribological coating 616, which are configured to reduce thermal stress applied to the column 600.

Figure 9B:
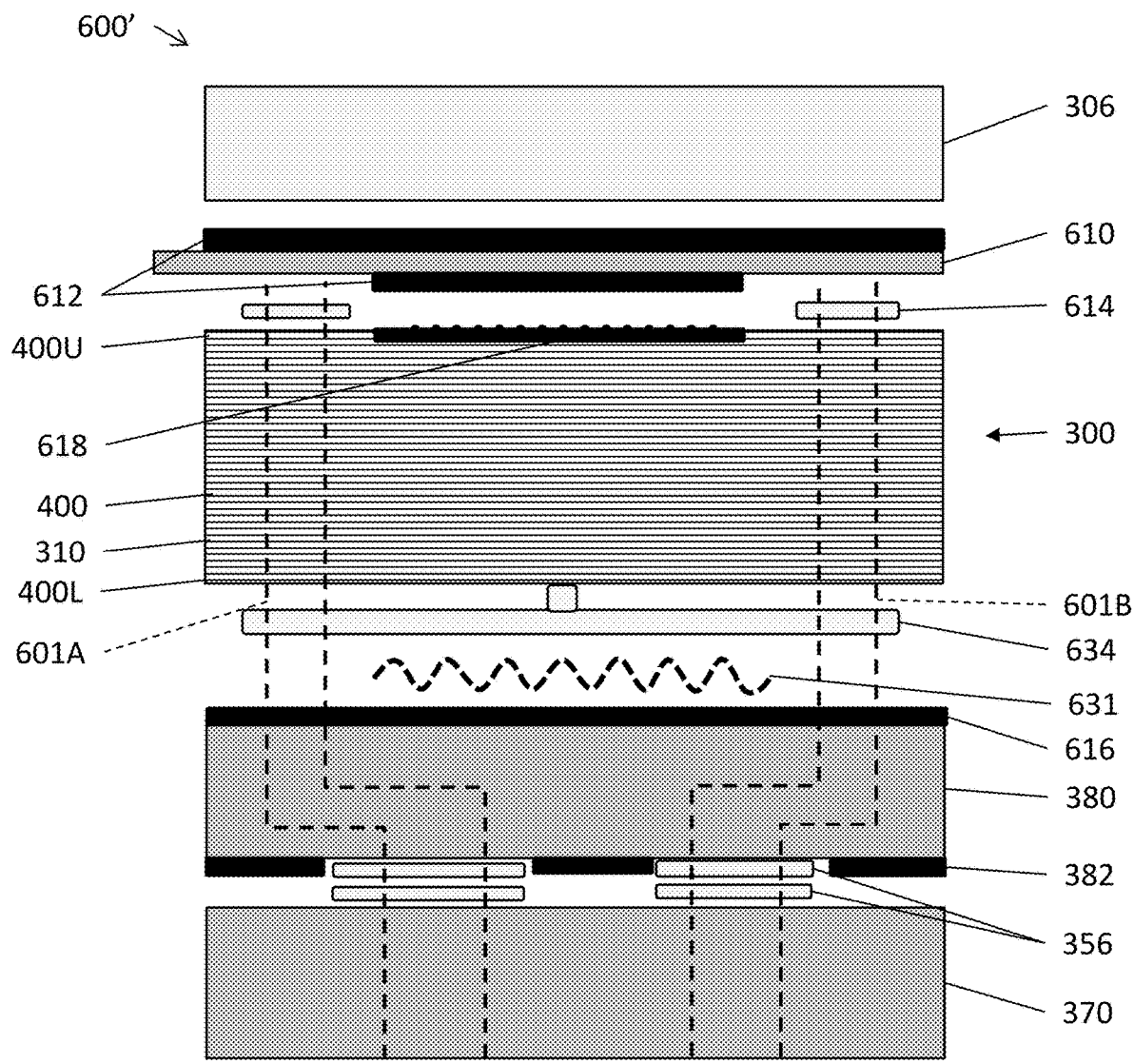
FIG. 9B is a simplified exploded side view of a modified version of the fuel cell column of FIG. 9A.
Figure 9C:
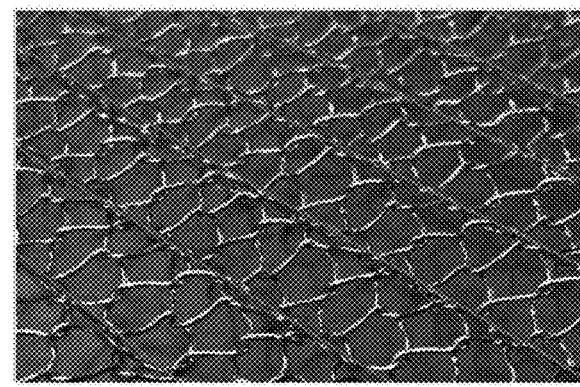
FIG. 9C is a photograph of an example of a conductive mesh of FIG. 9B.

FIG. 9B is a simplified exploded side view of a fuel cell column 600', according to various embodiments of the present disclosure. FIG. 9C is a photograph of an example of a crimped conductive mesh that may be used in the column 6oo' shown in FIG. 9B. The fuel cell column 600' is a modified version of the column 600 of FIG. 9A. As such, only the difference therebetween will be discussed in detail.

Referring to FIGS. 9B and 9C, the column 600' may include a wire mesh 631 as a compliant layer that electrically connects the stack 300 to the manifold plate 380. The mesh 631 may be formed of wire bent that is bent into a wave pattern, such as a herringbone wave pattern as shown in FIG. 9C. The mesh 631 may be crimped to create peaks and troughs of controllable height to control the thickness of the wire mesh 631. For example, the mesh 631 may have a thickness ranging from about 1 mm to about 20 mm, such as from about 1 mm to about 10 mm.

In one embodiment, the crimped mesh 631 may be formed of a material other than pure nickel to provide improved vertical compliance and oxidation resistance. Therefore, in some embodiments, the mesh 631 may be formed of a metal alloy, such as the above described Inconel 625, 446 stainless steel, Inconel 600, Hastelloy X, Crofer 22, or the like. Inconel 600 alloy may include 14 to 17 weight percent chromium, 6 to 10 weight percent iron, optionally 1 weight percent or less of Mn, Cu, Si, C and/or S, and at least about 72 weight percent (i.e., balance) nickel. Hastelloy X alloy may include about 22 weight percent chromium, about 18 weight percent iron, about 9 weight percent molybdenum, 1 to 2 atomic percent cobalt, optionally 1 weight percent or less of W, C, Mn, Si, B, Nb, Al and/or Ti, and at least about 47 weight percent (i.e., balance) nickel. Crofer 22 alloy may include about 20 to 24 weight percent chromium, 0.3 to 0.8 weight percent manganese, 0.03 to 0.2 weight percent titanium, 0.04 to 0.2 weight percent lanthanum, optionally 1 weight percent or less of C, S, Si, Cu, P and/or Al, and at least 73 weight percent (i.e., balance) iron.

In some embodiments, the mesh 631 may be fixed to the manifold plate 380, for example by resistance welding. In particular, mesh 631 may be welded along welding lines WL that extend along troughs of the mesh 631 where the mesh 631 contacts the manifold plate 380. Welding the mesh 631 to the manifold plate 380 enhances the elasticity of the mesh under load by creating a spring-like structure, which allows the mesh 631 to better adjust to changes to the camber-induced gap between the manifold plate 380 and the stack 300. For example, changes in the power output of the stack 300 and/or reduction and oxidation processes within the stack 300, may result in changes to the gap. However, the spring-like action of the mesh 631 allows the mesh 631 to remain in contact with and support the manifold plate 380 and the stack 300, when changes to the gap occur. As such, the mesh 631 may be configured to function as a spring to maintain electrical contact and reduce the chance of cracking cells of the stack 300, in a variety of operating conditions.

Figure 10A:
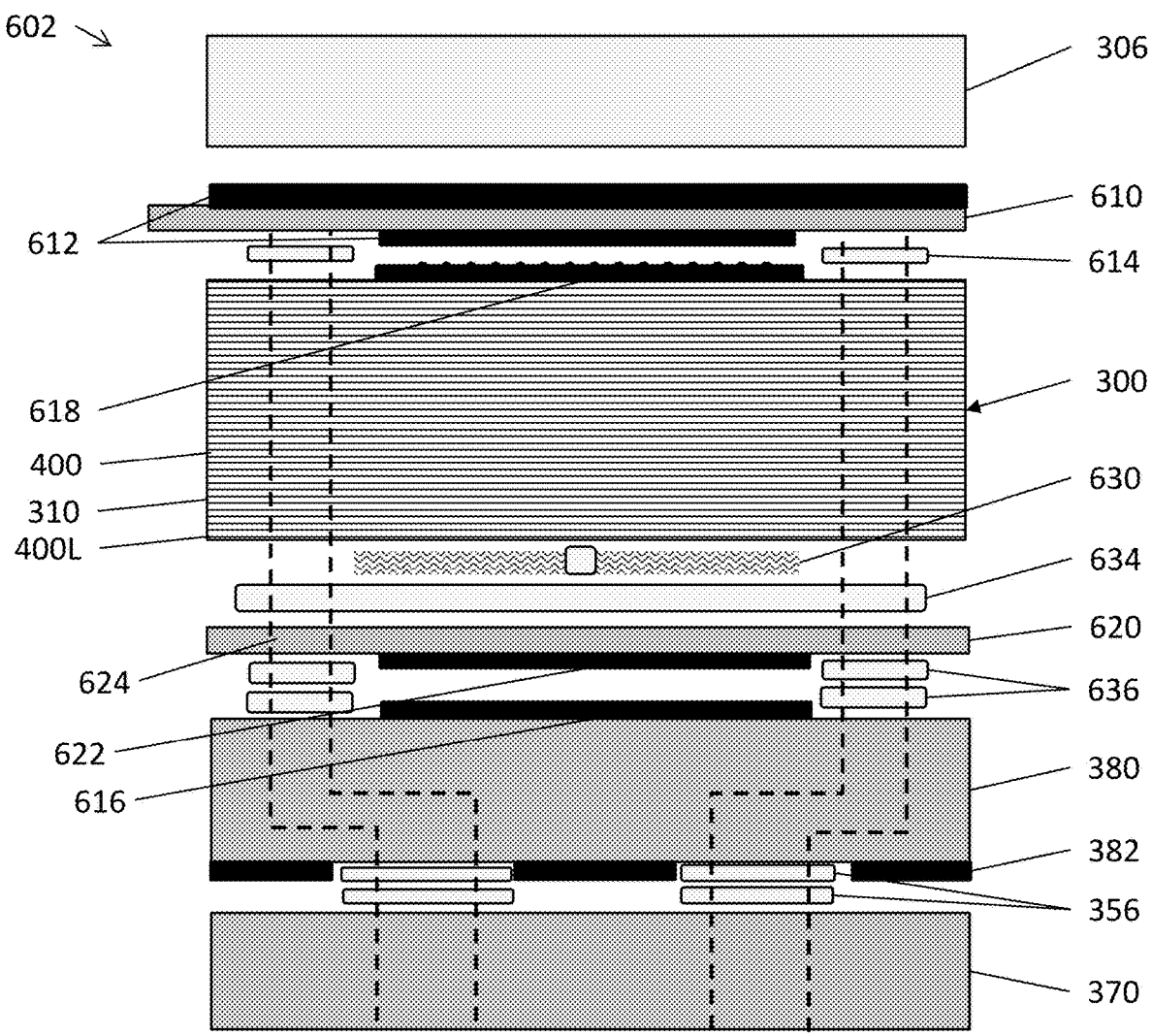
FIG. 10A is a simplified exploded side view of a fuel cell column, according to various embodiments of the present disclosure.
Figure 10B:
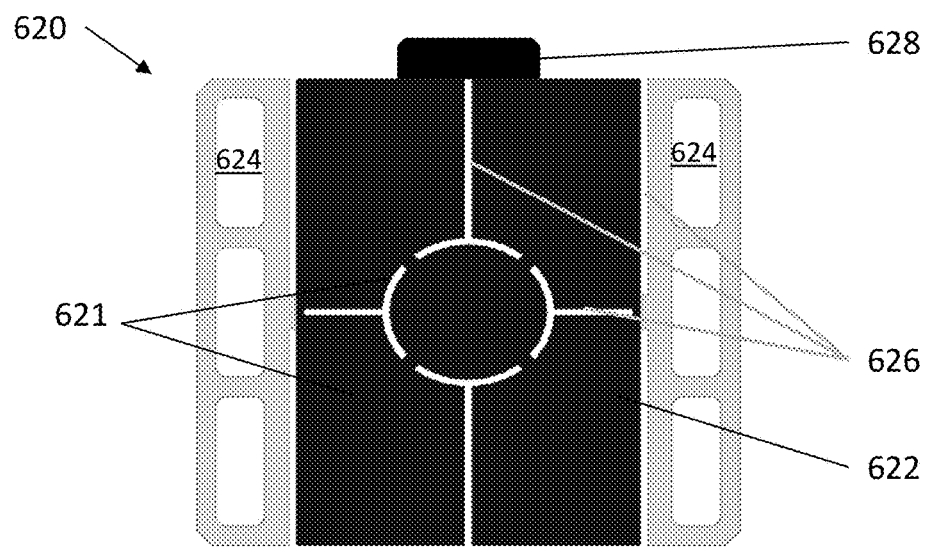
FIG. 10B is a bottom view of one embodiment of the bottom termination plate of FIG. 10A.

FIG. 10A is a simplified exploded side view of a fuel cell column 602, according to various embodiments of the present disclosure. FIG. 10B is a bottom view of one non-limiting embodiment of the bottom termination plate 620 of FIG. 10A. The column 602 may be similar to the column 600. As such, only the differences therebetween will be discussed in detail.

Referring to FIGS. 10A and 10B, the column 602 may additionally include a bottom termination plate 620 disposed between the stack 300 and the manifold plate 380 (e.g., below the compliant layer 630). The bottom termination plate 620 may be configured to act as a stress buffer by physically separating the stack 300 from the manifold plate 380. The bottom termination plate 620 may also improve electrical contact with the stack 300, thereby decreasing resistive losses.

The bottom termination plate 620 may be formed of for example a Cr—Fe alloy by a powder metallurgy process. The Cr—Fe alloy may comprise 4 to 6 weight percent iron and 94 to 96 weight percent chromium. Alternatively, the bottom termination plate 620 may be formed of another high-temperature metal alloy, such as Inconel 625, stainless steel 446, Haynes alloy (e.g., a nickel and chromium based alloy), ZMG232L iron chromium alloy comprising 22 to 24 weight percent Cr and at least 70 weight percent iron, or the like. A protective coating 622 may be formed on the bottom surface of the bottom termination plate 620 and/or the protective coating 616 may be formed on the top surface of the manifold plate 380. The protective coating 622 may be formed by the same methods and use the same materials as the protective coating 612. In some embodiments, the protective coating 622 may have a thickness ranging from about 40 µm to about 90 µm, such as from about 50 µm to about 80 µm, or about 65 µm. The bottom termination plate 620 may also include fuel inlet and outlet openings 624 configured to fluidly connect with corresponding fuel inlet and outlet holes of the manifold plate 380. In some embodiments, the bottom termination plate 620 may include an electrical contact 628.

In some embodiments, a tribological coating 616 may be used in addition to or in place of the protective coating 622. For example, the electrically-insulating ceramic material, such as alumina, zirconia, yttria stabilized zirconia (YSZ) (e.g., 3% yttria stabilized zirconia), or the like In some embodiments, the bottom termination plate 620 may be configured to operate as a buffer layer that physically separates the stack 300 and the manifold plate 380. In particular, the bottom termination plate 620 may be configured to relieve thermal stress between the stack 300 and the manifold plate 380. For example, as shown in FIG. 10B, the bottom termination plate 620 may comprise at least one compliant plate 621 that may be cut, scored, or split to form relief structures (e.g., cuts or grooves) 626 that allow for easy camber change. For example, the relief structures 626 may extend completely or partially through the bottom termination plate 620. The relief structures (e.g., grooves) 626 may be formed in or adjacent to portions of the bottom termination plate 620 that contact the stack 300. In some embodiments, the bottom termination plate 620 may be formed of multiple stacked compliant plates 621, such as from 1 to 5 stacked relief structure plates, that are laterally separated from each other by the relief structures (e.g., cuts). In other embodiments, the manifold plate 380 may be configured to operate as a buffer layer. In particular, the manifold plate 380 may include one or more of the compliant plates 621.

The column 602 may include stacked ring seals 636 configured to seal the fuel inlet and outlet openings 624 of the bottom termination plate 620 and corresponding inlet and outlet openings of the manifold plate 380. The seals 636 may be formed of a glass or glass-ceramic material and may have a thickness ranging from about 100 µm to about 300 µm, such as from about 150 µm to about 250 µm, or about 200 µm, prior to sintering and compression. The protective coating 622 may be omitted from portions of the bottom termination plate 620 that contact the seals 636.

Accordingly, the column 602 may include a mitigation structure configured to reduce stress applied to the stack 300, due to a shape mismatch and/or coefficient of thermal expansion mismatch, between the stack 300 and the manifold plate 380. The mitigation structure may also be configured to reduce electrical disconnections between the stack 300 and the manifold plate 380. The mitigation structure may include the compliant layer 630, the peripheral seal 634, the seals 636, and/or the bottom termination plate 620.

Figure 11:
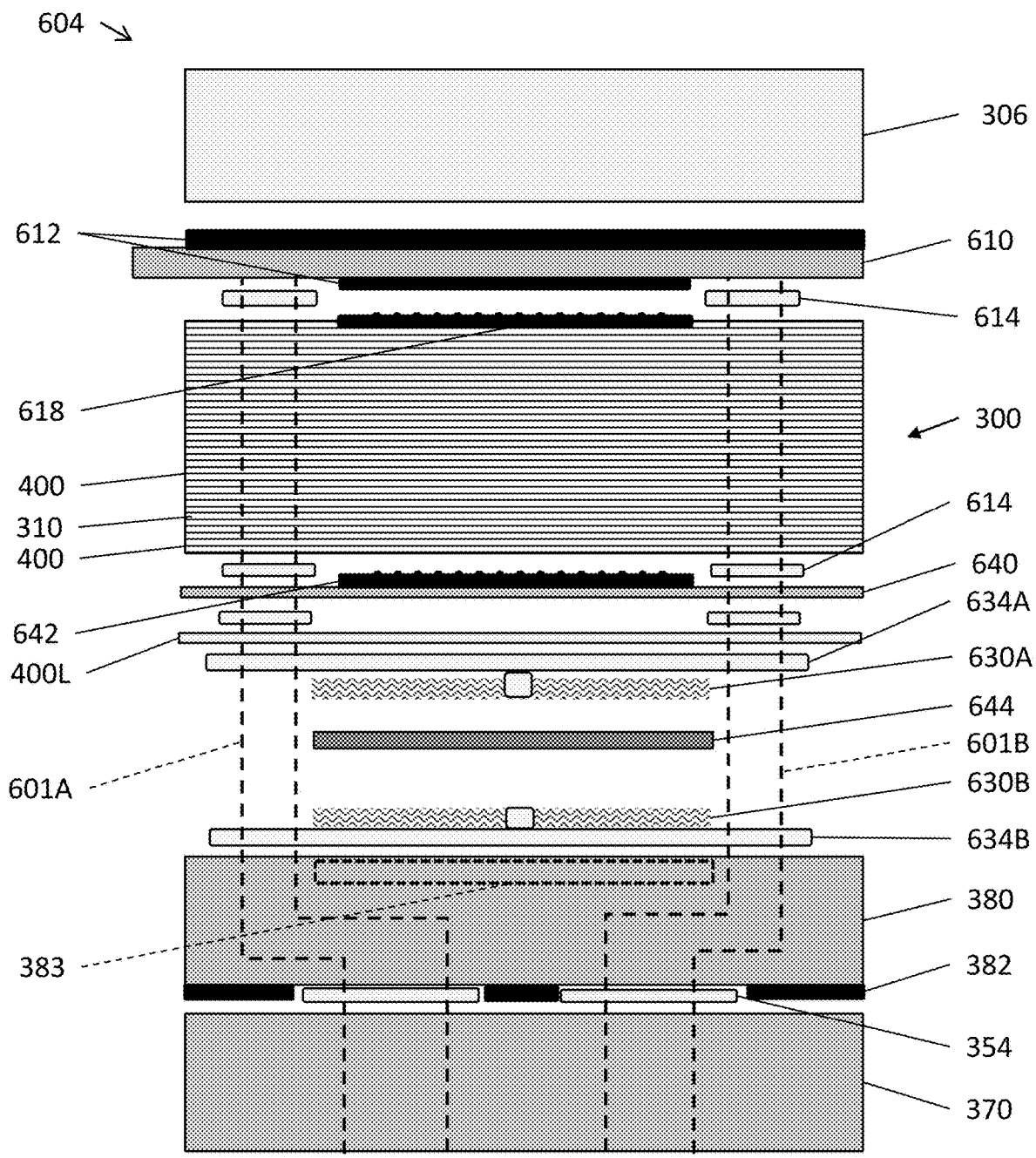
FIGS. 11-13 are a simplified exploded side views of fuel cell columns, according to various embodiments of the present disclosure.

FIG. 11 is a simplified exploded side view of a fuel cell column 604, according to various embodiments of the present disclosure. The column 604 may be similar to the column 602. As such, only the differences therebetween will be discussed in detail.

Referring to FIG. 11, the column 604 may include multiple conductive compliant layers, such as a first compliant layer 630A and a second compliant layer 630B. The compliant layers 630A, 630B may be formed of a respective conductive metal mesh, such as nickel mesh, for example.

In some embodiments, the compliant first and second layers 630A, 630B may be vertically separated from each other by a separator 644, which may be formed of a metal sheet or foil, for example. For example, the separator 644 may be formed of Inconel 625, 446 stainless steel, Haynes alloy, ZMG232L alloy, or other suitable high temperature alloys. Without wishing to bound by a particular theory, it is believed that the first and second compliant layers 630A, 630B formed of a nickel mesh may be compressed and reduced in thickness to a different extent in different areas of the column 604, and may thereby maintain electrical contact and compressive force across the entire areas thereof. The maximum extent of this deformation may determine the maximum curvature mismatch that can be accommodated. The deformation of the compliant layers 630A, 630B may depend on a variety of factors including wire thickness, oxidation state of the metal, compressive force applied, and/or other factors. Furthermore, stacking the first and second compliant layers 630A, 630B without the separator 644 may not increase the total compliance, since the mesh wires of the first and second compliant layers 630A, 630B may become interlaced, effectively creating a compliant layer of with double the wire density and a reduced thickness.

Therefore, separating the two compliant layers 630A, 630B with the separator 644 may effectively double the compliance. Multiple compliant layers 630A, 630B and separators 644 can be stacked in this way for even higher compliance. The separator 644 can be a continuous layer, or may be cut or split into 2, 4, or more pieces to improve compliance. In some embodiments, the separator 644 may include through holes.

The first compliant layer 630A may be surrounded by a first peripheral seal 634A, and the second compliant layer 62BA may be surrounded by a second peripheral seal 634B. The seals 634A, 634B may be formed of a glass or glass-ceramic material disposed over the perimeter of the manifold plate 380. The seals 634A, 634B may have a "figure eight" horizontal configuration containing a perimeter and a seal dam.

In some embodiments, the column 604 may include a dummy solid oxide fuel cell between the two bottommost interconnects in the stack 300. The dummy solid oxide fuel cell may be the same as the remaining solid oxide fuel cells 310 having a ceramic electrolyte in the stack 300, except that the dummy solid oxide fuel cell is electrically bypassed by a spot-welded jumper or electrical contact (now shown) connecting the two bottommost interconnects. This way, if the dummy solid oxide fuel cell cracks due to CTE mismatch and/or camber, then it would not increase the resistance of the column 604 since the cracked dummy cell is electrically bypassed in the column 604.

In other embodiments, the column 604 may include one or more optional dummy interconnects 640 that are similar to the interconnects 400 of the stack, but do not provide fuel or air to the fuel cells 310. The dummy interconnect 640 may be a Cr—Fe alloy interconnect formed by powder metallurgy.

In yet other embodiments, the dummy interconnect 640 may be formed of a conductive high-temperature metal alloy, such as Inconel 625, SS446, Haynes alloy, ZMG232L alloy, or the like. In this case, the dummy interconnect 640 may have a shape of a fuel cell, and be located between the two bottommost interconnects 400 in the stack 300 in place of the bottom most solid oxide fuel cell in the stack 300. The dummy interconnect 640 electrically shorts the two bottommost interconnects 400 in the stack 300. The dummy interconnect 640 may include a protective coating 642 on the air side thereof. In particular, the protective coating 642 may be configured to reduce oxidation of the air side of the dummy interconnect 640. In some embodiments, the protective coating 642 may be an LSM and/or MCO coating applied by APS or the like. In particular, a metal dummy interconnect 640 may provide improved resistance to breakage and/or fuel leakage, as compared to a ceramic dummy interconnect.

In various embodiments, the manifold plate 380 may include the recess 383 to at least partially accommodate the compliant layers 630A, 630B and/or the separator 644. In particular, the recess 383 may have a depth ranging from about 100 µm to about 150 µm, such as about 120 µm.

Accordingly, the column 604 may include a mitigation structure configured to reduce stress applied to the stack 300, due to a shape mismatch and/or coefficient of thermal expansion mismatch, between the stack 300 and the manifold plate 380. The mitigation structure may also be configured to reduce electrical disconnections between the stack 300 and the manifold plate 380. The mitigation structure may include the first compliant layer 630A, the second compliant layer 630B, the first peripheral seal 634A, the second peripheral seal 634B, and/or the dummy interconnect 640 or dummy fuel cell.

FIG. 12 is a simplified exploded side view of a fuel cell column 606, according to various embodiments of the present disclosure. The column 606 may be similar to the column 600. As such, only the differences therebetween will be discussed in detail.

Referring to FIG. 12, the fuel cell stack 300 of the column 606 may be in the odd configuration (as opposed to the stack 300 in the even configuration in the column 600 in FIG. 9). As such, the air side of the lowermost interconnect 400L may face the manifold plate 380. The conductive compliant layer 630 and the peripheral seal 634 may be disposed between the top termination plate 610 the uppermost interconnect 400U of the stack 300.

The protective coating 612 may be formed on the upper surface of the top termination plate 610, and may optionally be omitted from the bottom surface of the top termination plate 610 which faces the stack 300. A second protective coating 618 may be formed on the bottom surface of a lowermost interconnect 400L of the stack 300. The coating 618 may be formed of the same materials as the coating 612 of the top termination plate 610. In some embodiments, the coating 618 may be formed by contact printing and may have a thickness ranging from about 10 µm to about 50 µm, such as from about 20 µm to about 40 µm, or about 30 µm. For example, the coating 618 may have the same area and perimeter as the fuel cells 310 of the stack 300.

The protective coating 382, as described above with regard to FIG. 5A, may be disposed on the top and bottom surfaces of the manifold plate 380. On the top surface of the manifold plate 380, the coating 382 may have the same shape and area as the coating 618. The coating 382 may be formed by the same methods and materials as the coating 612. For example, the coating 382 may be formed of LSM applied by APS. The stack 300 may be connected to the manifold plate 380 by the ring-shaped manifold seals 614. The coating 382 may be omitted from portions of the manifold plate 380 that contact the manifold seals 614.

In some embodiments, the thickness of the coating 382 may be increased such that the coating 382 operates as a mitigation structure. For example, the coating 382 may have a thickness ranging from about 100 µm to about 550 µm, such as from about 120 µm to about 480 µm, or at least about 240 µm (e.g., 240 to 480 µm).

Figure 13:
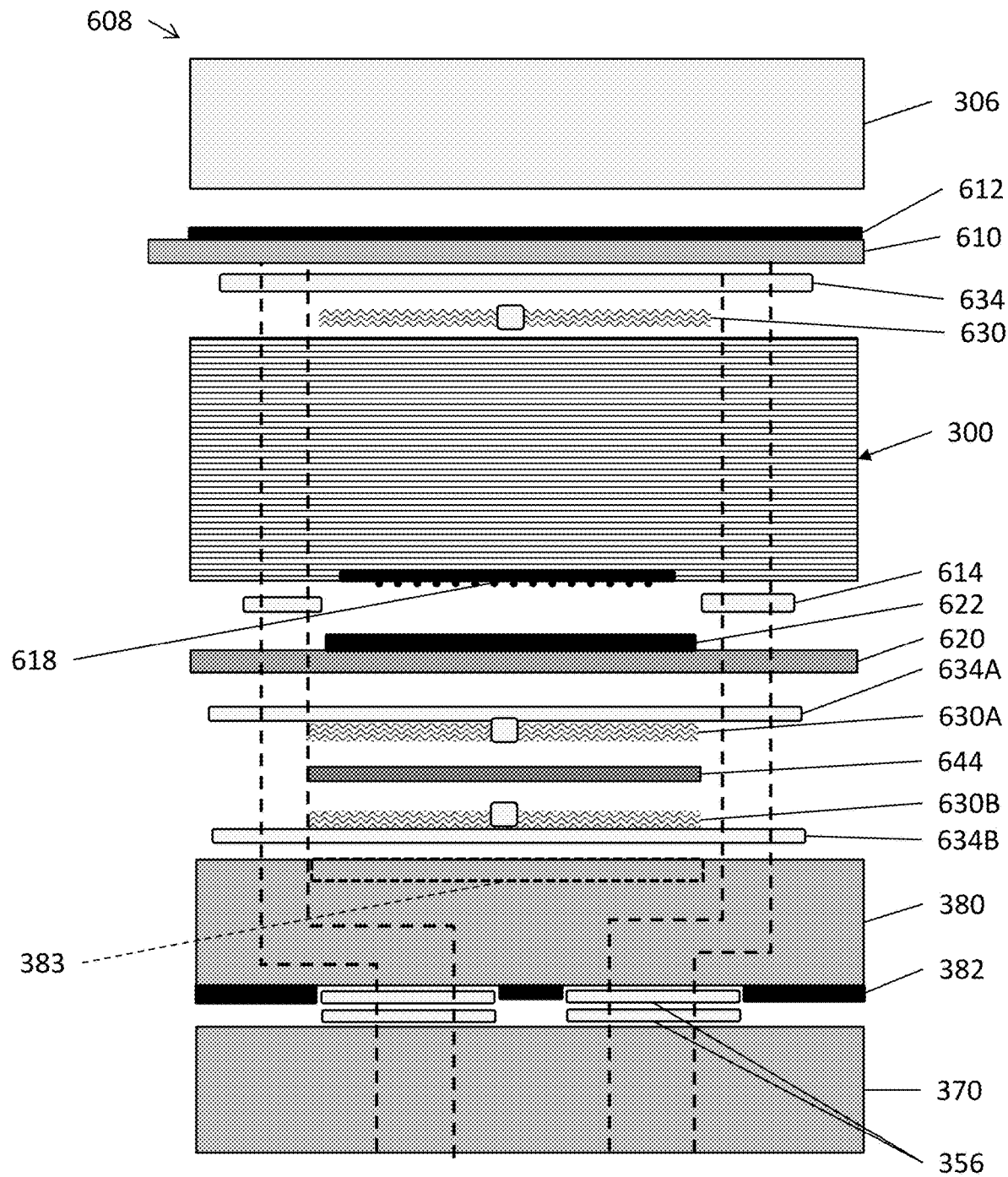

FIG. 13 is a simplified exploded side view of a fuel cell column 608, according to various embodiments of the present disclosure. The column 608 may be similar to the column 604. As such, only the differences therebetween will be discussed in detail.

Referring to FIG. 13, the fuel cell stack 300 of the column 608 may be in the odd configuration rather than in the even configuration shown in FIG. 11. As such, the air side of the lowermost interconnect 400L may face the manifold plate 380. The column 608 may include the first compliant layer 630A, the second compliant layer 630B, the first peripheral seal 634A, the second peripheral seal 634B, and the separator 644 located between the compliant layers 630A and 630B.

The column 608 may include a bottom termination plate 620 which separates the compliant layers 630A, 630B from the stack 300. In particular, the bottom termination plate 620 may be configured to prevent the compliant layers 630A, 630B from being exposed to oxygen flowing though the stack 300, in order to prevent oxidation of the compliant layers 630A, 630B. The bottom termination plate 620 may be formed of a conductive high-temperature metal alloy, such as Inconel 625, stainless steel 446, Haynes alloy, ZMG232L alloy, or the like. In some embodiments, the bottom termination plate 620 may include a spot-welded jumper (now shown). In other embodiments, the bottom termination plate 620 may be a dummy interconnect, similar to the chromium-iron alloy interconnects 400 formed by powder metallurgy which are located in the stack 300. In still other embodiments, the bottom termination plate 620 may be formed of one or more compliant plates 621 containing relief structures 626, as shown in FIG. 10B.

A protective coating 622 may be formed on the top surface of the bottom termination plate 620, where the bottom termination plate 620 is exposed to air. The protective coating 622 may be similar to the protective coating 612. For example, the coating 622 may be formed of LSM applied by APS.

In various embodiments, the top surface of any of the manifold plates 380 may be machined with an additional recess or pocket 383 to create the additional space for seals and/or the compliant layer(s) 630A and/or 630B. For example, a recess having a depth ranging from 80 µm to about 160 µm, such as from about 100 µm to about 140 µm, can be formed in the top of the manifold plate 380.

In various embodiments, any of the manifold plates 380 described above may include relief structures, similar to the relief structures 626 shown in FIG. 10B. For example, any of the manifold plates 380 may contain grooves or may be formed of two or more plates laterally separated by relief structures (e.g., cuts) in order to facilitate expansion and contraction of the manifold plate 380, and thereby reduce thermal stress applied to the corresponding fuel cells 310.

Accordingly, the column 606 includes a mitigation structure configured to reduce stress applied to the stack 300, due to a shape mismatch and/or coefficient of thermal expansion mismatch, between the stack 300 and the manifold plate 380. The mitigation structure may also be configured to reduce electrical disconnections between the stack 300 and the manifold plate 380. The mitigation structure may include the seals 614, 634A, 634B, the compliant layers 630A, 630B, the separator 644, the bottom termination plate 620, and/or the coating 622.

In various embodiments, the thickness of one or more conductive layers 318 (see FIGS. 3A, 3D) of the fuel cell stack 300 may be increased to provide increased compliancy. For example, the conductive layer 318 (e.g., a nickel mesh) between the bottommost fuel cell 310 and at least one of the bottommost two interconnects 400 of the stack may be increased to at least 80 µm, such as to from about 100 µm to about 160 µm, to absorb thermal stress and prevent damage to the stack 300. Thus, the nickel mesh between the bottom two interconnects may be thicker than the nickel meshes located between the remaining interconnects 400 and fuel cells 310 throughout the rest of the stack 300. Thus, in one embodiment, metal meshes are located between the interconnects 400 and the fuel cells 310 in the stack 300. In this embodiment, the mitigation structure comprises a bottom metal mesh located between the bottommost fuel cell and at least one of two bottommost interconnects in the stack, where the bottom metal mesh has a greater thickness than other metal meshes in the stack 300.

Figure 14A:
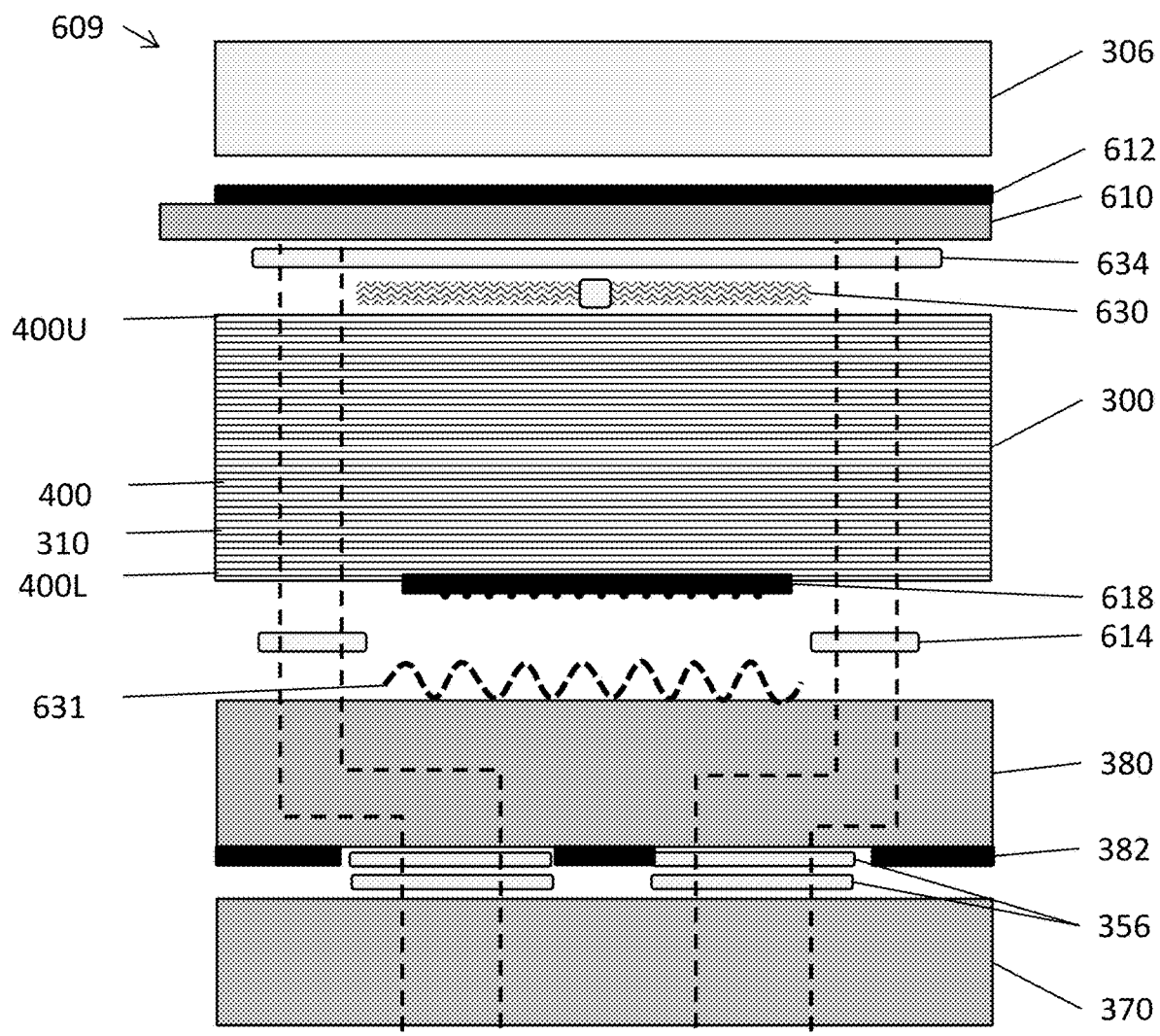
FIG. 14A is a simplified exploded side view of a fuel cell column, according to various embodiments of the present disclosure.
Figure 14B:
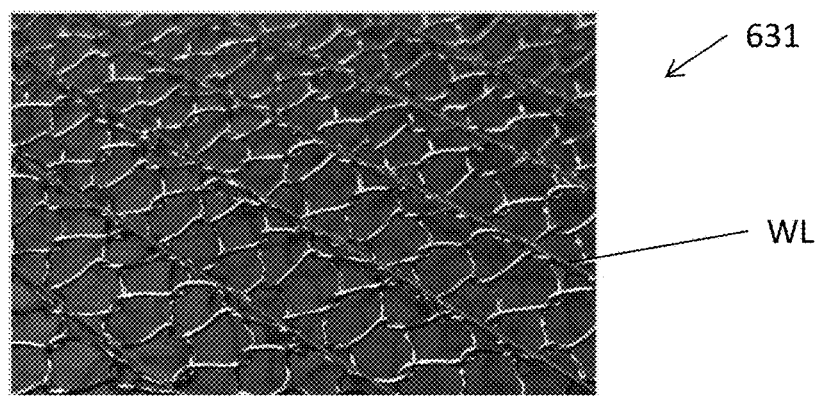
FIG. 14B is a photograph of an example of a conductive mesh of FIG. 14A.

FIG. 14A is a simplified exploded side view of a fuel cell column 609, according to various embodiments of the present disclosure. FIG. 14B is a photograph of a conductive mesh that may be used in the column 609 shown in FIG.

14A. The fuel cell column 609 is similar to the column 606 of FIG. 12. As such, only the difference therebetween will be discussed in detail.

Referring to FIGS. 14A and 14B, the column 609 may include a wire mesh 631 as a compliant layer that electrically connects the stack 300 to the manifold plate 380. The mesh 631 may be formed of wire bent that is bent into a wave pattern, such as a herringbone wave pattern as shown in FIG. 14B. The mesh 631 may be crimped to create peaks and troughs of controllable height to control the thickness of the wire mesh 631. For example, the mesh 631 may have a thickness ranging from about 1 mm to about 20 mm, such as from about 1 mm to about 10 mm. The mesh 631 may be crimped to create peaks and troughs of controllable height to control the thickness of the wire mesh 631. For example, the mesh 631 may have a thickness ranging from about 1 mm to about 20 mm, such as from about 1 mm to about 10 mm.

As described above, this mesh 631 may be formed of a material other than pure nickel. The mesh 631 may be formed of a metal alloy, such as Inconel 625, stainless steel 446, Inconel 600, Hastelloy X, Crofer 22, or the like.

In some embodiments, the mesh 631 may be fixed to the manifold plate 380, for example by resistance welding. In particular, mesh 631 may be welded directly to an uncoated planar surface of the manifold plate 380, along welding lines WL that extend along troughs of the mesh 631 where the mesh 631 contacts the manifold plate 380. Welding the mesh 631 to the manifold plate 380 enhances the elasticity of the mesh under load by creating a spring-like structure, which allows the mesh 631 to adjust to changes to the camber-induced gap between the manifold plate 380 and the stack 300. For example, changes in the power output of the stack 300 and/or reduction and oxidation processes within the stack 300, may result in changes to the gap. However, the spring-like action of the mesh 631 allows the mesh 631 to remain in contact with and support the manifold plate 380 and the stack 300, when changes to the gap occur. As such, the mesh 631 may be configured to function as a spring to maintain electrical contact and reduce the chance of cracking cells of the stack 300, in a variety of operating conditions.

In various embodiments, a peripheral seal 634, as described above with respect to FIG. 9A, may optionally be applied around the mesh 631, in order to limit air exposure and/or oxidation of the mesh 631.

In some embodiments, the mesh 631 may also be used in place of the compliant layer 630 at the top of the stack 300. For example, the mesh 631 may be welded to the top termination plate 610. In other embodiments, the mesh 631 may be disposed between the top of the stack 300 and the termination plate 610, in the even configurations as shown in FIGS. 9A-11, or in place of any of the compliant layers 630 disclosed herein.

The manifold plates, coatings, and/or compliant layers disclosed herein may protect fuel cell stacks from damage due to CTE variations between the manifold plates and corresponding fuel cell stacks.

Fuel cell systems of the embodiments of the present disclosure are designed to reduce greenhouse gas emissions and have a positive impact on the climate.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular. Further, any step or component of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell column, comprising:
a stack of alternating fuel cells and interconnects, wherein the interconnects separate adjacent fuel cells in the stack and contain fuel and air channels which are configured to provide respective fuel and air to the fuel cells;
a manifold plate comprising a bottom inlet hole and a bottom outlet hole located in a bottom surface of the manifold plate, top outlet holes and top inlet holes formed in opposing sides of a top surface of the manifold plate, outlet channels that extend inside of the manifold plate to fluidly connect the top inlet holes to the bottom inlet hole, and inlet channels that extend inside of the manifold plate to fluidly connect the top outlet holes to the bottom outlet hole; and
a mitigation structure configured to reduce stress applied to the stack due to at least one of a shape mismatch or coefficient of thermal expansion mismatch between the stack and the manifold plate.

2. The fuel cell column of claim 1, wherein:
the manifold plate supports the stack; and
the mitigation structure comprises a compliant metal mesh disposed between the stack and the manifold plate and configured to mitigate a compressive load applied by the stack on the manifold plate, the compliant metal mesh having a thickness of at least 80 μm.

3. The fuel cell column of claim 2, wherein:
the compliant metal mesh is disposed in a recess located in the top surface of the manifold plate; or
the compliant metal mesh is welded to the top surface of the manifold plate.

4. The fuel cell column of claim 2, further comprising a peripheral seal surrounding the compliant metal mesh and disposed between the stack and the manifold plate.

5. The fuel cell column of claim 4, wherein:
the mitigation structure further comprises a bottom termination plate disposed between the manifold plate and the stack and electrically connected to the stack; and
the compliant metal mesh and the peripheral seal are disposed on a top side of the bottom termination plate.

6. The fuel cell column of claim 5, wherein:
a protective coating is disposed on a bottom side of the bottom termination plate, the protective coating comprising a perovskite material, a spinel material, or a combination thereof; or
the bottom termination plate comprises at least one relief plate comprising relief structures cut or inscribed therein; or the mitigation structure further comprises the peripheral seal, the peripheral seal comprising a compliant vermiculite, mica, or a glass-mica seal material; or the mitigation structure further comprises a high-temperature tribological coating configured to reduce friction between the stack and the bottom termination plate, and wherein the tribological coating comprises an electrically insulating ceramic material layer or a powder coating comprising a perovskite material; or the mitigation structure further comprises a dummy interconnect disposed between the manifold plate and the stack, and the compliant metal mesh and the peripheral seal are disposed between the dummy interconnect and the manifold plate.

7. The fuel cell column of claim 1, wherein the mitigation structure comprises a dummy solid oxide fuel cell located between two bottommost interconnects in the stack and which is electrically bypassed in the fuel cell column.

8. The fuel cell column of claim 1, wherein the mitigation structure comprises a dummy metal or metal alloy interconnect located between two bottommost interconnects in the stack and which electrically shorts the two bottommost interconnects.

9. The fuel cell column of claim 1, wherein the mitigation structure comprises:
a compliant first metal mesh and a compliant second metal mesh located between the stack and the manifold plate;
a separator comprising a metal sheet or foil located between the compliant first and second metal meshes;
a first peripheral seal comprising a glass or glass-ceramic material and surrounding the compliant first metal mesh; and
a second peripheral seal comprising a glass or glass-ceramic material and surrounding the compliant second metal mesh.

10. The fuel cell column of claim 9, wherein:
at least one of the compliant first and second metal meshes are disposed in a recess formed in the top surface of the manifold plate; or
a bottom termination plate is disposed between the stack and the compliant first and second metal meshes, and a protective coating disposed on a top side of the bottom termination plate, the protective coating comprising a perovskite material, a spinel material, or a combination thereof; or
the compliant first and second meshes and the separator have the same area and perimeter as the fuel cells.

11. The fuel cell column of claim 1, wherein the mitigation structure comprises a protective coating disposed on the top surface of the manifold plate, the protective coating having the same area and perimeter as the fuel cells, and a thickness ranging from about 120 μm to about 480 μm, and further comprising manifold seals comprising a glass or glass-ceramic material and configured to seal the inlet and outlet holes of the manifold plate to corresponding inlet and outlet holes of the stack.

12. The fuel cell column of claim 1, wherein:
the manifold plate comprises stainless steel; and
the interconnects comprise a Cr—Fe alloy.

13. The fuel cell column of claim 1, wherein the mitigation structure comprises a relief plate of the manifold plate, the relief plate comprising relief structures that extend completely through the relief plate to laterally separate the relief plate into compliant plates.

14. The fuel cell column of claim 1, further comprising a bottom termination plate disposed between the manifold plate and the stack, wherein the mitigation structure comprises relief structures that extend completely through the bottom termination plate to laterally separate the bottom termination plate into compliant plates.

15. The fuel cell column of claim 1, wherein the mitigation structure comprises a peripheral seal disposed between the stack and the manifold plate, the peripheral seal comprising a compliant vermiculite, mica, or a glass-mica seal material.

16. The fuel cell column of claim 1, wherein the mitigation structure comprises a high-temperature tribological coating configured to reduce friction between the stack and the manifold plate, and wherein the tribological coating comprises an electrically insulating ceramic material layer or a powder coating comprising a perovskite material.

17. The fuel cell column of claim 1, wherein the mitigation structure comprises a dummy interconnect disposed between the manifold plate and the stack.

18. The fuel cell column of claim 1, further comprising metal meshes located between the interconnects and the fuel cells in the stack, wherein the mitigation structure comprises a bottom metal mesh located between a bottommost fuel cell and at least one of two bottommost interconnects in the stack, wherein the bottom metal mesh has a greater thickness than other metal meshes in the stack.

19. The fuel cell column of claim 2, wherein:
the compliant metal mesh comprises a nickel or nickel alloy mesh containing between 1.5 and 2.5 wires per millimeter, a wire thickness between 125 and 200 microns, and mesh thickness between 250 and 400 microns; or
the compliant metal mesh is bent to include peaks and valleys such that the compliant metal mesh functions as a spring, and wherein the valleys are welded to a top surface of the manifold plate.

20. The fuel cell column of claim 2, wherein the compliant metal mesh contains knuckles; and:
at least some of the knuckles in the compliant metal mesh are skipped; or
holes are formed through a thickness of the compliant metal mesh to reduce a number of knuckles in the compliant metal mesh, and the holes have a width which is at least four times larger the spacing between wires of the compliant metal mesh.

* * * * *